United States Patent
Honda

(10) Patent No.: US 9,385,827 B2
(45) Date of Patent: Jul. 5, 2016

(54) TRANSMISSION APPARATUS AND METHOD

(71) Applicant: FUJITSU LIMITED, Kawasaki-shi, Kanagawa (JP)

(72) Inventor: Takashi Honda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 300 days.

(21) Appl. No.: 13/644,923

(22) Filed: Oct. 4, 2012

(65) Prior Publication Data
US 2013/0028077 A1 Jan. 31, 2013

Related U.S. Application Data

(63) Continuation of application No. PCT/JP2010/056430, filed on Apr. 9, 2011.

(51) Int. Cl.
*H04L 12/26* (2006.01)
*H04J 3/16* (2006.01)
*H04J 3/14* (2006.01)

(52) U.S. Cl.
CPC *H04J 3/1652* (2013.01); *H04J 3/14* (2013.01)

(58) Field of Classification Search
CPC .......... H04J 3/14; H04J 3/1652; H04J 3/085; H04J 14/00; H04J 2203/006
See application file for complete search history.

(56) References Cited

U.S. PATENT DOCUMENTS

| 5,978,354 A | 11/1999 | Taketomi et al. |
| 6,625,115 B1 * | 9/2003 | Ikeda ........................ H04J 3/085 370/217 |
| 2003/0123493 A1 | 7/2003 | Takahashi |
| 2003/0169684 A1 * | 9/2003 | Yamanaka ......... H04Q 11/0062 370/216 |
| 2008/0069563 A1 * | 3/2008 | Wang .................... H04L 12/437 398/59 |

FOREIGN PATENT DOCUMENTS

| EP | 0969615 | 1/2000 |
| JP | 9-36824 | 2/1997 |
| JP | 2000-156694 | 6/2000 |
| JP | 2003-69521 | 3/2003 |
| JP | 2003-134072 | 5/2003 |
| JP | 2003-188919 | 7/2003 |
| JP | 2005-005959 | 1/2005 |

OTHER PUBLICATIONS

International Search Report of PCT/JP2010/056430 mailed Jul. 6, 2010.

* cited by examiner

*Primary Examiner* — Afshawn Towfighi
(74) *Attorney, Agent, or Firm* — Staas & Halsey LLP

(57) ABSTRACT

A transmission apparatus includes an acquisition device that acquires a switch request for plural types of transmission sections overlapping with one another at least at apart of the sections, a selection device that selects one of the switch requests for plural types of transmission sections according to priority level information about a priority level corresponding to each of the plural types of transmission sections, and a switch device that switches the transmission paths depending on the selected switch request.

8 Claims, 20 Drawing Sheets

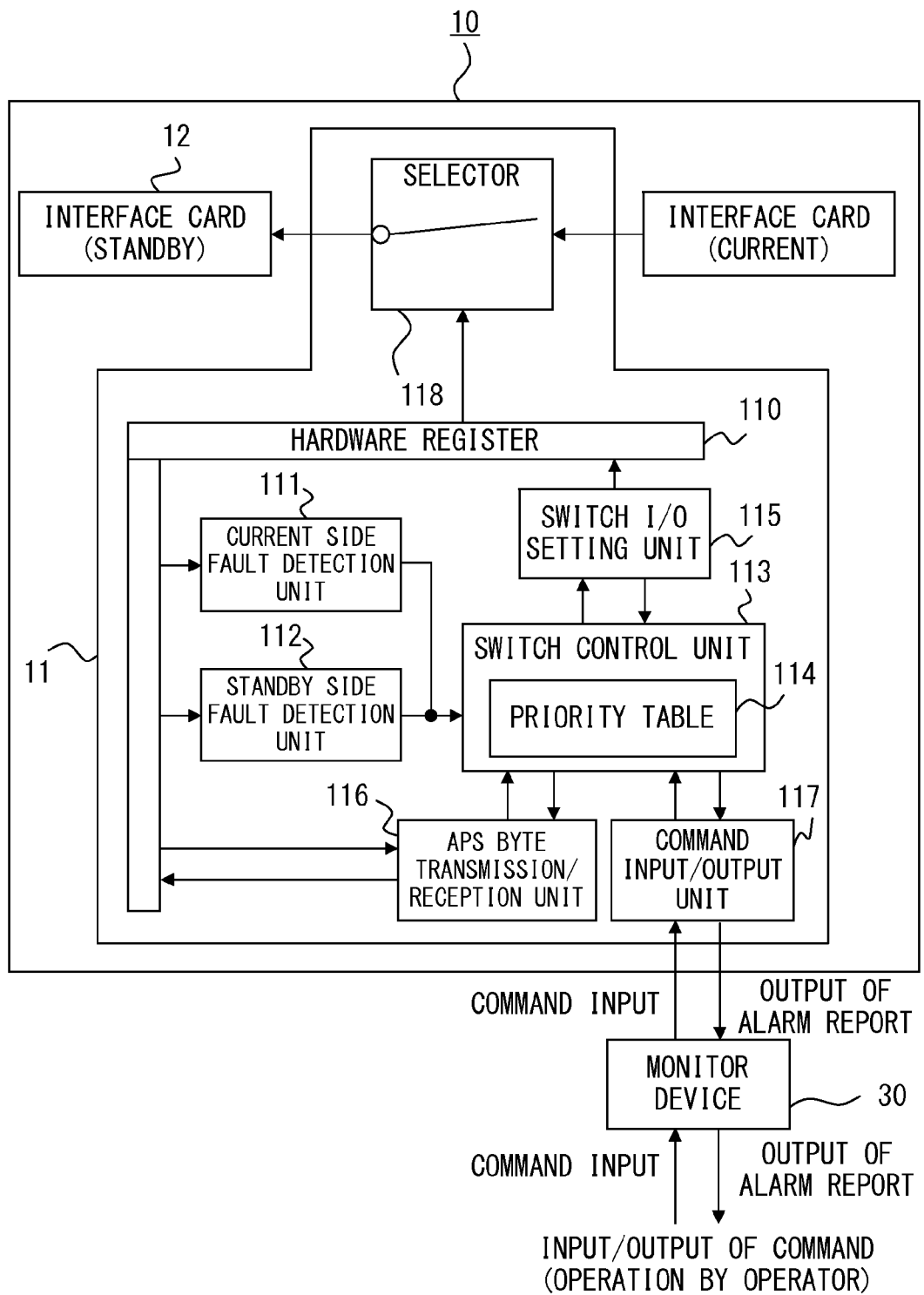
F I G. 2

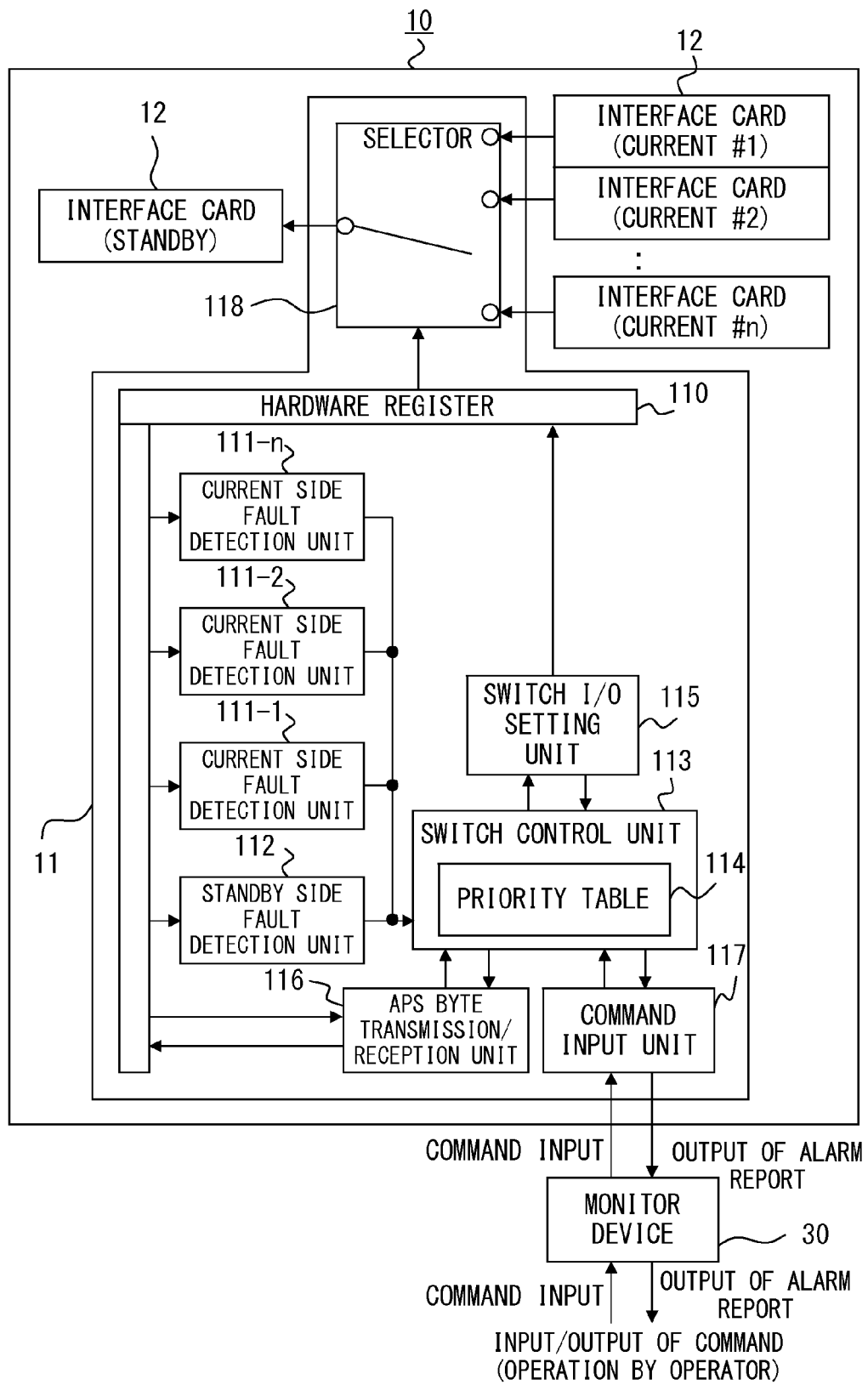
F I G. 3

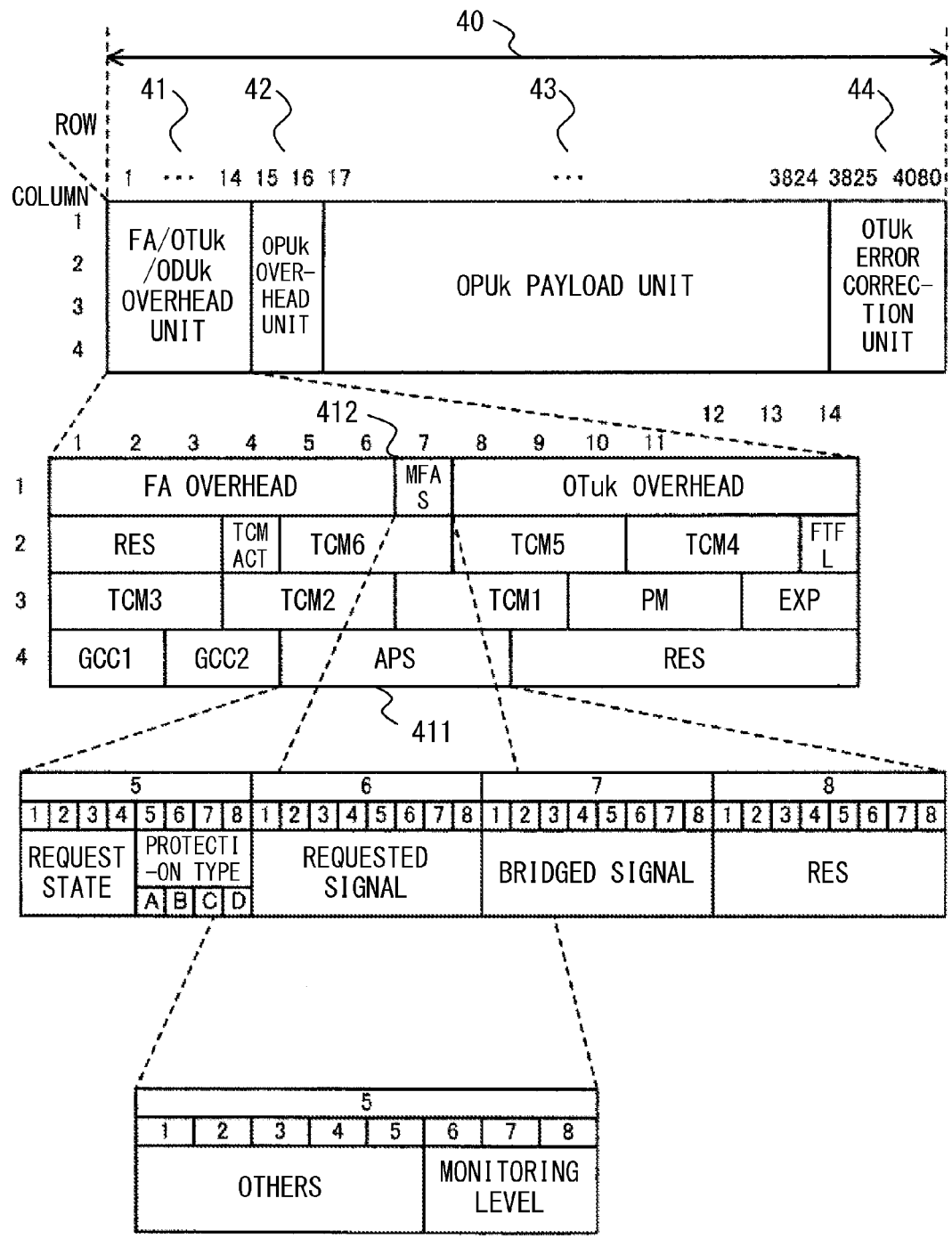
F I G. 4

411

| FIELD | | VALUE | STATE |
|---|---|---|---|
| REQUEST STATE | | 1111 | Lockout of Protection (LO) |
| | | 1110 | Forced Switch (FS) |
| | | 1100 | Signal Fail (SF) |
| | | 1010 | Signal Degrade (SD) |
| | | 1000 | Manual Switch (MS) |
| | | 0110 | Wait-to-Restore (WTR) |
| | | 0100 | Exercise (EXER) |
| | | 0010 | Reverse Request (RR) |
| | | 0001 | Do Not Revert (DNR) |
| | | 0000 | No Request (NR) |
| | | others | Reserved |
| PROTECTION TYPE | A | 0 | No APS Channel |
| | | 1 | APS Channel |
| | B | 0 | 1+1 (Permanent Bridge) |
| | | 1 | 1:n (no Permanent Bridge) |
| | C | 0 | Unidirectional switching |
| | | 1 | Bidirectional switching |
| | D | 0 | Non-revertive operetion |
| | | 1 | Revertive operetion |
| REQUESTED SIGNAL | | 0 | Null Signal |
| | | 1-254 | Normal Traffic Signal |
| | | 255 | Extra Traffic Signal |
| BRIDGED SIGNAL | | 0 | Null Signal |
| | | 1-254 | Normal Traffic Signal |
| | | 255 | Extra Traffic Signal |

FIG. 5

| FIELD | VALUE | STATE |
|---|---|---|
| MONITORING LEVEL | 000 | ODUk PATH |
| | 001 | ODUk TCM1 |
| | 010 | ODUk TCM2 |
| | 011 | ODUk TCM3 |
| | 100 | ODUk TCM4 |
| | 101 | ODUk TCM5 |
| | 110 | ODUk TCM6 |
| | 111 | ODUk SECTION |

| PRIORITY LEVEL | PATH | | TCM | | SECTION | |
|---|---|---|---|---|---|---|
| | VALUE | STATE | VALUE | STATE | VALUE | STATE |
| ↑ HIGH | 1111 | LO | – | – | – | – |
| | – | – | 1111 | LO | – | – |
| | – | – | – | – | 1111 | LO |
| | 1110 | FS | – | – | – | – |
| | 1100 | SF | – | – | – | – |
| | 1010 | SD | – | – | 1110 | FS |
| | – | – | 1110 | FS | – | – |
| | – | – | 1100 | SF | – | – |
| | – | – | 1010 | SD | – | – |
| | – | – | – | – | 1110 | FS |
| | – | – | – | – | 1100 | SF |
| | – | – | – | – | 1010 | SD |
| | 1000 | MS | – | – | – | – |
| | – | – | 1000 | MS | – | – |
| | – | – | – | – | 1000 | MS |
| | 0110 | WTR | – | – | – | – |
| | – | – | 0110 | WTR | – | – |
| | – | – | – | – | 0110 | WTR |
| | 0100 | EXER | – | – | – | – |
| | – | – | 0100 | EXER | – | – |
| | – | – | – | – | 0100 | EXER |
| | 0010 | RR | – | – | – | – |
| | – | – | 0010 | RR | – | – |
| | – | – | – | – | 0010 | RR |
| | 0001 | DNR | – | – | – | – |
| | – | – | 0001 | DNR | – | – |
| | – | – | – | – | 0001 | DNR |
| LOW | 0000 | NR | – | – | – | – |
| | – | – | 0000 | NR | – | – |
| | – | – | – | – | 0000 | NR |

| PRIORITY LEVEL | PATH | | TCM | | TCM (FEND) | | SECTION | | SECTION (FEND) | |
|---|---|---|---|---|---|---|---|---|---|---|
| | VALUE | STATE | VALUE | STATE | VALUE | STATE | VALUE | STATE | VALUE | STATE |
| ↑ HIGH | 1111 | LO | – | – | – | – | – | – | – | – |
| | – | – | 1111 | – | – | – | – | – | – | – |
| | – | – | – | – | 1111 | LO | – | – | – | – |
| | – | – | – | – | – | – | 1111 | – | – | – |
| | – | – | – | – | – | – | – | – | 1111 | LO |
| | 1110 | FS | – | – | – | – | – | – | – | – |
| | 1100 | SF | – | – | – | – | – | – | – | – |
| | 1010 | SD | – | – | – | – | – | – | – | – |
| | – | – | 1110 | FS | – | – | – | – | – | – |
| | – | – | 1100 | SF | – | – | – | – | – | – |
| | – | – | 1010 | SD | – | – | – | – | – | – |
| | – | – | – | – | 1110 | FS | – | – | – | – |
| | – | – | – | – | 1100 | SF | – | – | – | – |
| | – | – | – | – | 1010 | SD | – | – | – | – |
| | – | – | – | – | – | – | 1110 | FS | – | – |
| | – | – | – | – | – | – | 1100 | SF | – | – |
| | – | – | – | – | – | – | 1010 | SD | – | – |
| | – | – | – | – | – | – | – | – | 1110 | FS |
| | – | – | – | – | – | – | – | – | 1100 | SF |
| | – | – | – | – | – | – | – | – | 1010 | SD |
| | 1000 | MS | – | – | – | – | – | – | – | – |
| | – | – | 1000 | MS | – | – | – | – | – | – |
| | – | – | – | – | 1000 | MS | – | – | – | – |
| | – | – | – | – | – | – | 1000 | MS | – | – |
| ↓ | – | – | – | – | – | – | – | – | 1000 | MS |

| PRIORITY LEVEL | PATH | | TCM | | TCM (FEND) | | SECTION | | SECTION (FEND) | |
|---|---|---|---|---|---|---|---|---|---|---|
| | VALUE | STATE | VALUE | STATE | VALUE | STATE | VALUE | STATE | VALUE | STATE |
| ↑ | – | – | – | – | – | – | – | – | 1000 | MS |
| | 0110 | WTR | – | – | – | – | – | – | – | – |
| | – | – | 0110 | WTR | – | – | – | – | – | – |
| | – | – | – | – | 0110 | WTR | – | – | – | – |
| | – | – | – | – | – | – | 0110 | WTR | 0110 | WTR |
| | 0100 | EXER | – | – | – | – | – | – | – | – |
| | – | – | 0100 | EXER | – | – | – | – | – | – |
| | – | – | – | – | 0100 | EXER | – | – | – | – |
| | – | – | – | – | – | – | 0100 | EXER | 0100 | EXER |
| | 0010 | RR | – | – | – | – | – | – | – | – |
| | – | – | 0010 | RR | – | – | – | – | – | – |
| | – | – | – | – | 0010 | RR | – | – | – | – |
| | – | – | – | – | – | – | 0010 | RR | 0010 | RR |
| | 0001 | DNR | – | – | – | – | – | – | – | – |
| | – | – | 0001 | DNR | – | – | – | – | – | – |
| | – | – | – | – | 0001 | DNR | – | – | – | – |
| | – | – | – | – | – | – | 0001 | DNR | 0001 | DNR |
| LOW | 0000 | NR | 0000 | NR | 0000 | NR | 0000 | NR | 0000 | NR |

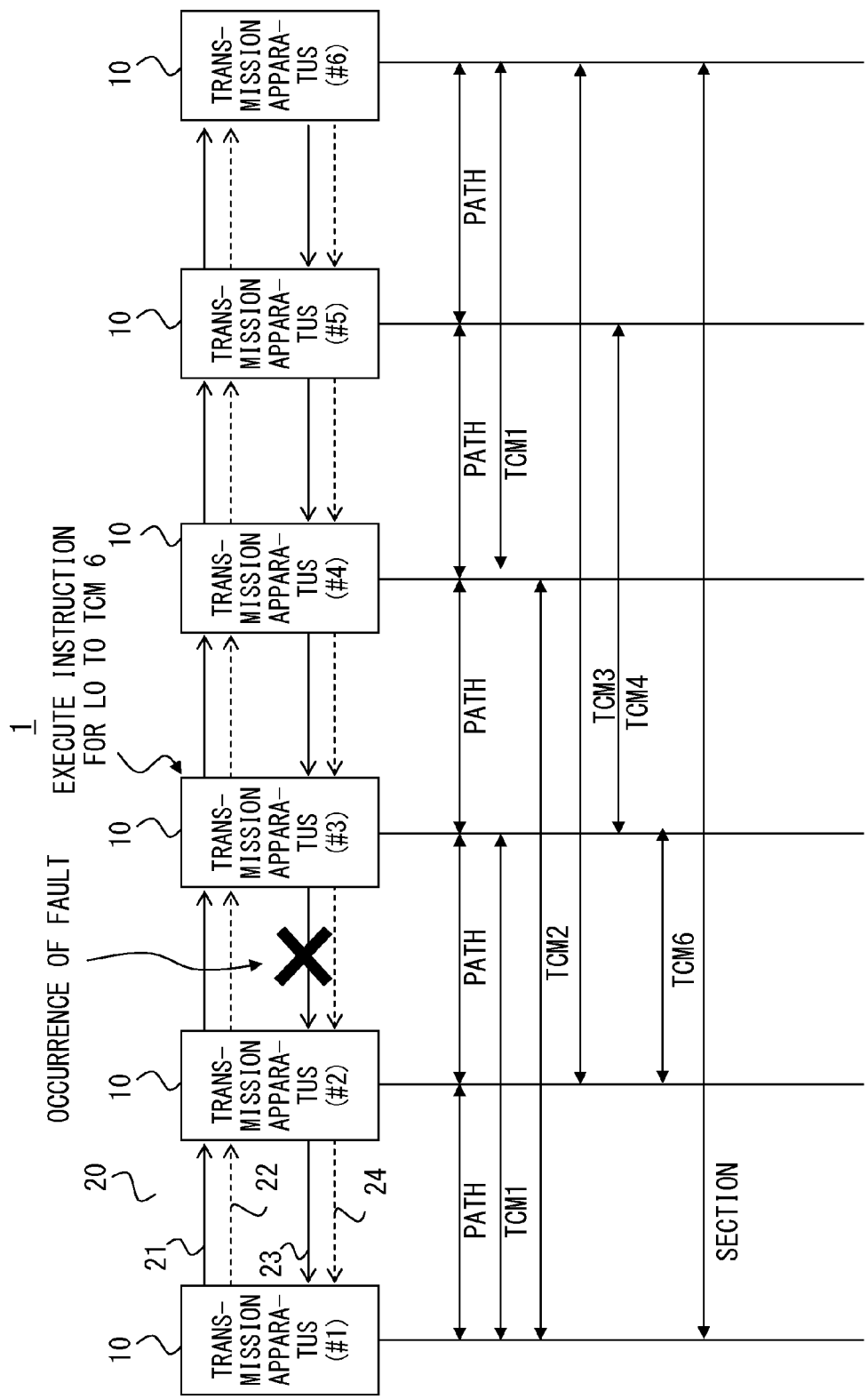

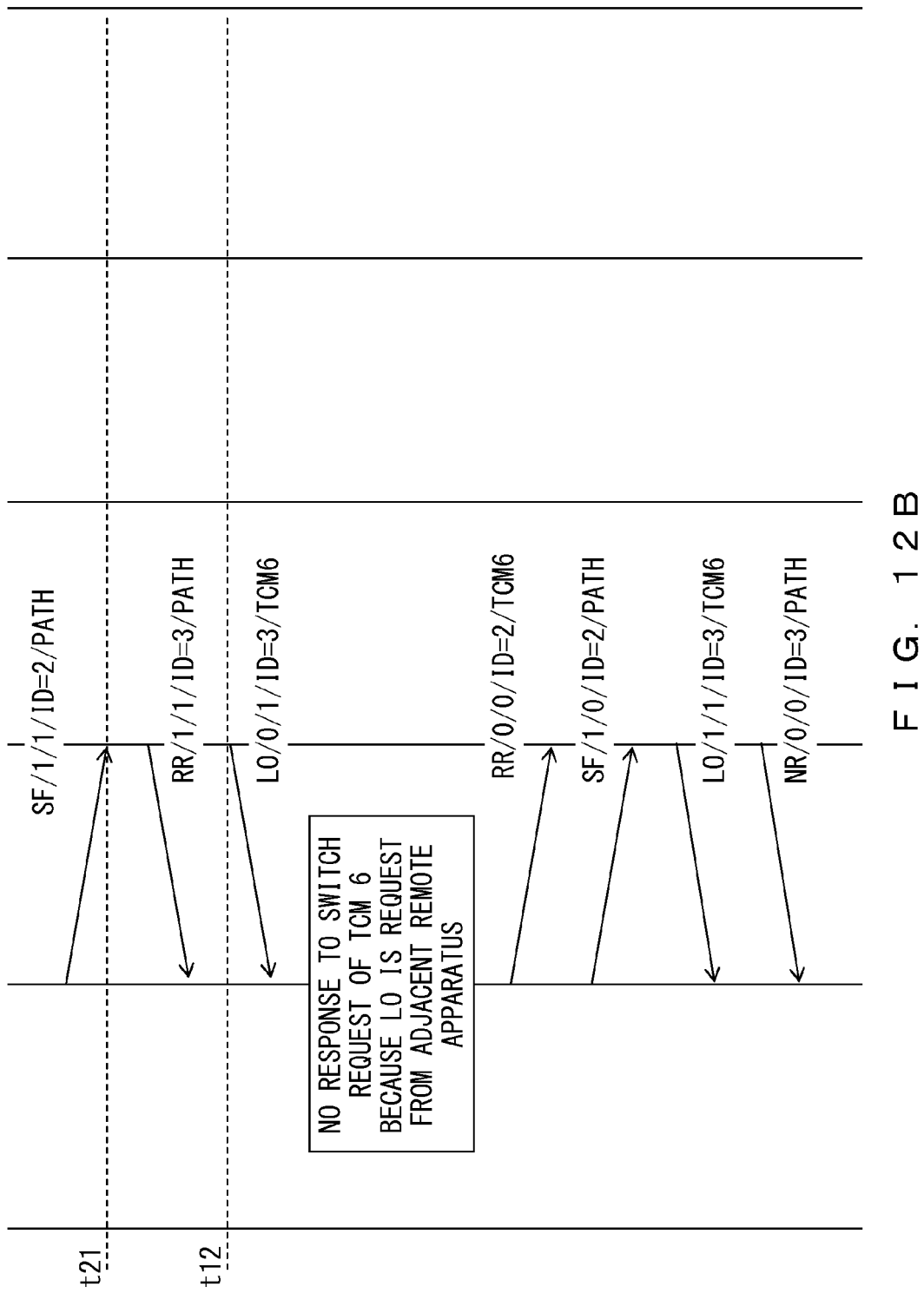

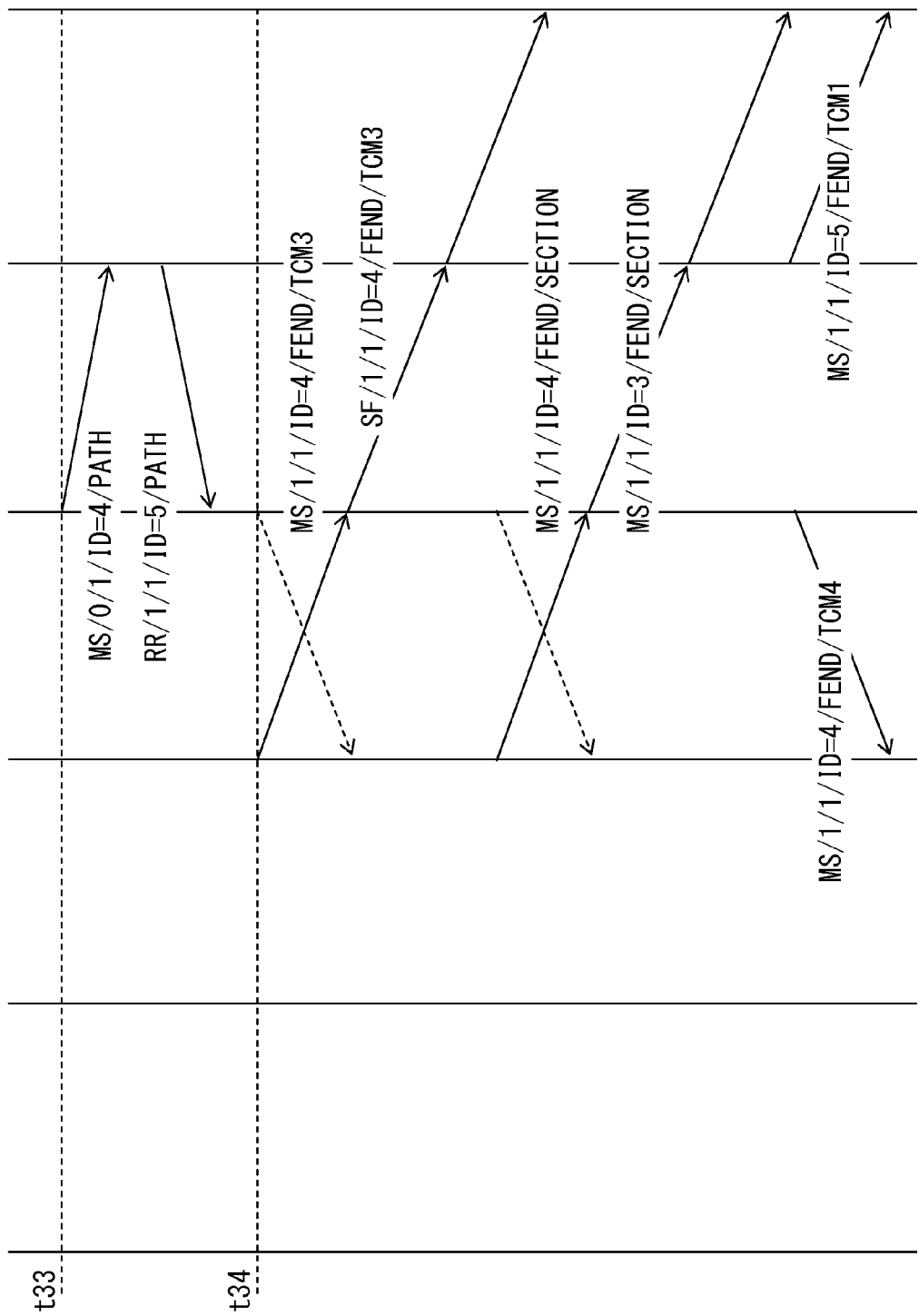

TRANSMISSION APPARATUS AND METHOD

CROSS-REFERENCE TO RELATED APPLICATION

This application is a continuation application of International Application PCT/JP2010/056430 filed on Apr. 9, 2010 and designated the U.S., the entire contents of which are incorporated herein by reference.

FIELD

The embodiments discussed herein are related to a transmission apparatus and method for transmitting and receiving a signal.

BACKGROUND

As a communication standard adopted for a basic transmission line of a backbone circuit etc. and other transmission lines etc., there is an OTN (Optical Transport Network) recommended in the ITU-T (International Telecommunication Union Telecommunication standardization sector). In the OTN, a plurality of circuits (for example, a current circuit and a standby circuit) set for a transmission line are switched to improve the reliability and operability of a transmission line. A system of switching a plurality of circuits may be a 1+1 switch, a 1:n switch, etc. Switching a plurality of circuits is performed by each transmission apparatus referring to the APS (Automatic Protection Switching) byte (otherwise, the APS channel).

On the other hand, in the OTN, in addition to the concept of a segment (transmission section) such as a path and a section adopted in the SDH (Synchronous Digital Hierarchy), the SONET (Synchronous Optical NETwork), etc., a new concept of a segment, that is, a TCM (Tandem Connection Monitoring), is introduced. The TCM may be freely set for the segment of an arbitrary position on the transmission line or arbitrary length. That is, by introducing the TCM, a specific segment may be set for each network provider and user. Therefore, a fault generation state, a circuit quality, etc. may be monitored for the specific segment for each network provider and user.

DOCUMENT OF PRIOR ART

Patent Document 1: Japanese Laid-open Patent Publication No. 2003-69521

SUMMARY

According to an aspect of the embodiments, a transmission apparatus includes an acquisition device, a selection device, and a switch device. The acquisition device acquires a switch request for a transmission path of a signal in plural types of transmission sections at least apart of whose sections overlap one another. The selection device selects one of a plurality of switch requests based on the priority level information indicating a priority level. The switch device switches transmission paths depending on one switch request selected by the selection device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a block diagram of an example of a configuration of the transmission apparatus according to the embodiment;

FIG. 3 is a block diagram of another example of a configuration of the transmission apparatus according to the embodiment;

FIG. 4 is a data structure diagram of the data structure of an OTN frame;

FIG. 5 is a data structure diagram of the data structure of the APS byte included in the OTN frame;

FIG. 6 is a data structure diagram of the data structure of an MFAS included in the OTN frame;

FIG. 8 is a table illustrating an example of a priority table used in the first operation example;

FIGS. 11A and 11B are a table illustrating an example of a priority table used in the second operation example;

FIGS. 12A and 12B illustrate a sequence of another example of the operation of the transmission apparatus corresponding to the second operation example;

FIGS. 15A and 15B illustrate a sequence of another example of the operation of the transmission apparatus corresponding to the third operation example.

DESCRIPTION OF EMBODIMENTS

Figure 1:
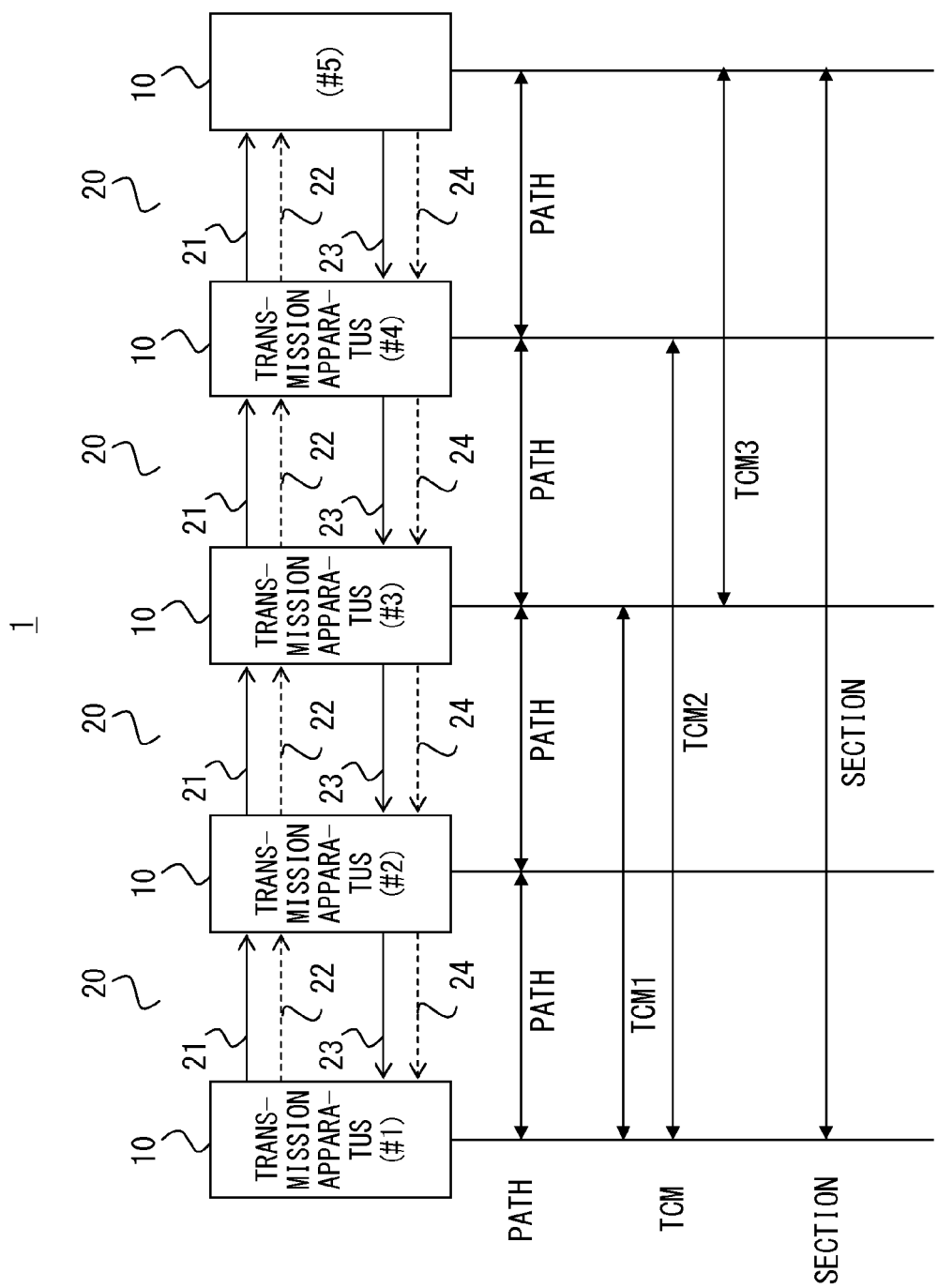
FIG. 1 is a block diagram of an example of a configuration of the transmission system according to an embodiment.

In the OTN, by using an MFAS (Multi Frame Alignment Signal), the APS may be individually transmitted to each of according to plural types of segments according to the MFAS and APS. Therefore, the above-mentioned 1+1 switch and the 1:n switch are performed in a path unit, a section unit, or a TCM unit. However, in the current 1+1 switch and 1:n switch, a circuit switch is considered on a single segment as a path. Therefore, when a circuit switch request occurs on plural types of segments, there occur technical problems such as that the time up to the completion of a switch (that is, saving a faulty circuit) becomes relatively longer, the optimum switch is not performed, an unnecessary switch occurs, etc.

For example, considered is the case in which a switch request from the standby circuit to the current circuit is issued by an FS (Forced Switch) to the TCM including as an intermediate node the first and second transmission apparatuses after an issue of a switch request from the current circuit to the standby circuit caused by a fault which has occurred in the path between the first transmission apparatus and the second transmission apparatus. In this case, in the path between the first and second transmission apparatuses, a switch from the current circuit to the standby circuit is performed. On the other hand, in the TCM including as an intermediate node the first and second transmission apparatuses, a switch from the standby circuit to the current circuit is performed. However, since a fault has occurred in the path between the first and second transmission apparatuses, it is difficult to normally transmit a signal afterwards by a switch to the current circuit in the TCM. Therefore, the optimum switch is not necessarily performed.

In addition, when not only a new segment of the TCM is introduced, but also plural types of segments are introduced, the above-mentioned technical problems occur. That is, when a switch request for a path and a switch request for a section are issued in the SDH and the SONET in which the concept of a path and a section is adopted, similar technical problems may occur.

The above-mentioned problem is an example of the problems to be solved by embodiments. The embodiments aim at providing a transmission apparatus capable of appropriately switching the transmission path even when a switch request is issued to different types of transmission sections, and a method therefore.

The embodiments relate to a transmission apparatus and method for transmitting and receiving a signal, and more concretely to a transmission apparatus and method for transmitting and receiving a signal on a backbone circuit as, for example, a basic transmission line The embodiments are described below with reference to the attached drawings. Described in the explanation below is an example of a transmission apparatus in accordance with the OTN (Optical Transport Network) recommended by the ITU-T (International Telecommunication Union Telecommunication Standardization Sector).

(1) Configuration of Transmission System

The configuration of a transmission system 1 provided with a transmission apparatus 10 according to the present embodiment is described below with reference to FIG. 1. FIG. 1 is a block diagram of an example of a configuration of the transmission system according to the present embodiment.

As illustrated in FIG. 1, the transmission system 1 includes a plurality of transmission apparatuses 10 and liner transmission lines 20. The configuration of the transmission system 1 illustrated in FIG. 1 is an example, and the transmission apparatus 10 described below may be applied to the transmission system having other configurations (for example, a transmission system etc. to which a plurality of transmission apparatuses are connected through a ring transmission line).

The plurality of transmission apparatuses 10 are interconnected through the liner transmission lines 20. Each of the plurality of transmission apparatuses 10 may transmit and receive a specified signal (for example, an OTN frame 40 described later. Refer to FIG. 4) with another transmission apparatus 10. In FIG. 1, an example having five transmission apparatuses 10 (concretely, the transmission apparatus (#1) 10, the transmission apparatus (#2) 10, the transmission apparatus (#3) 10, the transmission apparatus (#4) 10, and the transmission apparatus (#5) 10) is disclosed, but the number of the transmission apparatuses 10 illustrated in FIG. 1 is optional. The transmission system 1 may be provided with any number of transmission apparatuses 10.

The liner transmission line 20 transmits and receives a signal among a plurality of transmission apparatuses 10. The liner transmission line 20 includes, for example, optical fiber etc. In the example illustrated in FIG. 1, the optical fiber used in transmitting a signal and the optical fiber used in receiving a signal are included as viewed from one transmission apparatus 10. A part of the band of the liner transmission line 20 is used as a current circuit 21 or 23, and another part of the band is used as a standby circuit 22 or 24. In FIG. 1, as viewed from one transmission apparatus 10, a part of the band of the optical fiber used in transmitting (or receiving) a signal is used as the current circuit 21, and another part of the band of the optical fiber is used as the standby circuit 22. Similarly, in FIG. 1, as viewed from one transmission apparatus 10, a part of the band of the optical fiber used in receiving (or transmitting) a signal is used as the current circuit 23, and another part of the band of the optical fiber is used as the standby circuit 24.

The transmission system 1 adopts the hierarchical concept for the transmission path of a signal to be transmitted. According to the present embodiment, the transmission system 1 adopts a segment (transmission section) of three types of hierarchical layers, that is, a path, a TCM (Tandem Connection Monitoring (the maximum of 6 TCMs in the OTN)), and a section. The segment expressed as having hierarchical layers illustrated in FIG. 1 is an example, but a concept of another segment may be adopted, and a concept of a segment of a larger number of types or a smaller number of types may be adopted.

(2) Configuration of Transmission Apparatus

The configuration of the transmission apparatus 10 according to the present embodiment is described with reference to FIG. 2. FIG. 2 is a block diagram of an example of a configuration of the transmission apparatus 10 according to the present embodiment.

As illustrated in FIG. 2, the transmission apparatus 10 includes a controlling unit 11 for controlling or managing the operation of the transmission apparatus 10 and an interface card 12 for transmitting and receiving a signal to and from an external unit to the transmission apparatus 10 through the liner transmission line 20 under the control of the controlling unit 11. FIG. 2 exemplifies an example having the interface card 12 for the current circuits 21 and 23, and the interface card 12 for the standby circuits 22 and 24. That is, FIG. 2 exemplifies the transmission apparatus 10 for performing the 1+1 switch for switching one current circuit 21 (or 23) and one standby circuit 22 (or 24). Each of the controlling unit 11 and the interface card 12 is implemented for the book-shelf-shaped housing loaded with a back wiring board on the back.

The controlling unit 11 includes a hardware register 110, a current side fault detection unit 111, a standby side fault detection unit 112, a switch control unit 113 as an example of a "selection device", a priority table 114 as an example of "priority level information", a switch I/O (Input/Output) setting unit 115, an APS (Automatic Protection Switching) byte transmission/reception unit 116 as an example of an "acquisition device", a "transmission device" and a "reception device", a command input unit 117 as an example of an "acquisition device", and a selector 118.

When a signal is received, the hardware register 110 stores a signal transferred from the interface card 12. At a read request from the 111, the standby side fault detection unit, or the APS byte transmission/reception unit 116, the hardware register 110 outputs the stored signal to the current side fault detection unit 111, the standby side fault detection unit 112, or the APS byte transmission/reception unit 116. When a signal is transmitted, the hardware register 110 stores a selector control signal transferred from the switch I/O setting unit 115. The hardware register 110 outputs the stored selector control signal to the selector 118.

The current side fault detection unit 111 detects the presence/absence of a fault in the current circuit 21 or 23 according to the signal etc. transferred from the interface card 12.

The standby side fault detection unit 112 detects the presence/absence of a fault generated in the standby circuit 22 or 24 according to the signal etc. transferred from the interface card 12.

The switch control unit 113 controls the switch of the transmission path of the signal in the transmission system 1 according to the fault detection result by the current side fault detection unit 111, an APS byte 411 (refer to FIG. 4) received by the APS byte transmission/reception unit 116 and the standby side fault detection unit 112, and the command input from a monitor device 30. For example, the switch control unit 113 determines whether or not a switch from the current circuit 21 to the standby circuit 22 (or a switch from the current circuit 23 to the standby circuit 24) and a switch from the standby circuit 22 to the current circuit 21 (or a switch from the standby circuit 24 to the current circuit 23) are to be made. Otherwise, for example, the switch control unit 113 selects which is to be used, the current circuit 21 or the standby circuit 22 as a transmission path of the signal (or which is to be used, the current circuit 23 or the standby circuit 24, as a transmission path of the signal). When a switch of a transmission path is made, the switch control unit 113 instructs the switch I/O setting unit 115 to output an appropriate selector control signal so that the input and output of the selector 118 may be appropriately switched.

The priority table 114 indicates the priority (that is, the determination condition) based on which it is determined whether or not a switch from the current circuit 21 to the standby circuit 22 (or a switch from the current circuit 23 to the standby circuit 24), and a switch from the standby circuit 22 to the current circuit 21 (or a switch from the 24 to the current circuit 23) are to be made. The priority table 114 may be stored in the memory etc. not illustrated in the attached drawings in the switch control unit 113, and stored in the memory etc. arranged in another position.

The switch I/O setting unit 115 outputs a selector control signal for a switch of the input and output of the selector 118 to the hardware register 110 under the control of the switch control unit 113.

The APS byte transmission/reception unit 116 acquires the APS byte 411 (refer to FIG. 4) included in the signal transferred from the interface card 12, and transfers the acquired APS byte 411 to the switch control unit 113. In addition, the APS byte transmission/reception unit 116 adds the APS byte 411 to the signal transferred to the interface card 12 (that is, the signal transmitted externally to the transmission apparatus 10) in response to the transmit instruction of the APS byte 411 output from the switch control unit 113.

The command input unit 117 receives a command (concretely, for example, a command relating to a circuit switch request) input from an external operator etc. to the transmission apparatus 10 through the monitor device 30. The command input unit 117 outputs the input command to the switch control unit 113. The command input unit 117 also outputs a report of an alarm generated in the transmission apparatus 10 and various logs to the monitor device 30.

The selector 118 performs a 1+1 switch by appropriately reading the selector control signal stored in the hardware register 110. That is, the selector 118 performs a switch from the current circuit 21 to the standby circuit 22 (or a switch from the current circuit 23 to the standby circuit 24) or a switch from the standby circuit 22 to the current circuit 21 (or a switch from the standby circuit 24 to the current circuit 23).

FIG. 2 illustrates the transmission apparatus 10 for a 1+1 switch. Otherwise, the transmission apparatus 10 for performing the 1:n switch may be applied to the transmission system 1 according to the present embodiment. When the 1:n switch is performed, as illustrated in FIG. 3, the transmission apparatus 10 is different from the transmission apparatus 10 illustrated in FIG. 2 in that the transmission apparatus 10 includes current fault detection units 111_1 through 111_n depending on the number n of the current circuits and the interface cards 12 for the current circuit depending on the number n of the current circuits. Other configurations of the transmission apparatus 10 for performing the 1:n switch may be the same as those of the transmission apparatus 10 for performing the 1+1 switch.

(3) Data Structure of OTN Frame

The data structure of the OTN frame 40 as a signal transmitted and received on the transmission system 1 according to the present embodiment is described below with reference to FIGS. 4 through 6. FIG. 4 is a data structure diagram of the data structure of the OTN frame 40. FIG. 5 is a data structure diagram of the data structure of the APS byte 411 included in the OTN frame 40. FIG. 6 is a data structure diagram of the data structure of the MFAS 412 included in the OTN frame 40.

As illustrated in FIG. 4, the OTN frame 40 includes an FA/OTUk/ODUk overhead unit (Frame Alignment/Optical channel Transport Unit k/Optical channel Data Unit k overhead) 41, an OPUk overhead unit (Optical channel Payload Unit k overhead) 42, an OPUk payload unit (OPUk Payload) 43, and an OTUk error correction unit (OTUk FEC: OTUk Forward Error Correction) 44. The data structure of the OTN frame 40 is also defined by an ITU-T G. 709.

The FA/OTUk/ODUk overhead unit 41 has a frame size of 14 bytes×4 lines corresponding to the fields of the first through 14th columns. The FA/OTUk/ODUk overhead unit 41 is used in transmitting the OTN frame 40, managing the transmission quality, etc. The FA/OTUk/ODUk overhead unit 41 includes, for example, an FA overhead unit, the MFAS (Multi Frame Alignment Signal) 412, an OTUk overhead unit, TCM1 through TCM 6 (Tandem Connection Monitoring), an FTFL (Fault Type & Fault Location reporting channel), a PM (Path Monitoring), an EXP (EXPerimental), GCC1 through GCC2 (General Communication Channel), and the APS byte 411, and a RES (reserved) area.

The OPUk overhead unit 42 has a frame size of 2 bytes×4 lines corresponding to the fields in the 15th and 16th columns. The OPUk overhead unit 42 includes various types of information for control and management of the OPUk payload unit 43. Concretely, the OPUk overhead unit 42 includes, for example, a PSI (Payload Structure Identifier), a mapping and coupling unit (Mapping & Concat. specific) etc.

The OPUk payload unit 43 has a frame size of 3808 bytes×4 lines corresponding to the fields in the 17th through 3824th columns. The OPUk payload unit 43 includes a signal of a client for providing one or more services.

The OTUk error correction unit 44 has a frame size of 256 bytes×4 lines corresponding to the fields in the 3825th through 4080th columns. The OTUk error correction unit 44 includes various types of information for correction of an error generated during the transmission of the OTN frame 40.

Described furthermore are the APS byte 411 and the 412 as examples of the information relating to the switch of transmission paths according to the present embodiment.

As illustrated in FIG. 4, the APS byte 411 includes a request state having a 4-bit size as an example of "request state information", a protection type having a 4-bit size, a requested signal having an 8-bit size, a bridged signal having an 8-bit size, and a RES area having an 8-bit size. The data structure of the APS byte 411 is defined by ITU-T G. 873 etc.

As illustrated in FIG. 5, when the value of the request state is "1111", it indicates "lockout of protection (LO)". When the value of the request state is "1110", it indicates "Forced Switch (FS)". When the value of the request state is "1100", it indicates "signal fail (SF)". When the value of the request state is "1010", it indicates "signal degrade (SD)". When the value of the request state is "1000", it indicates "manual switch (MS)". When the value of the request state is "0110", it indicates "wait-to-restore (WTR)". When the value of the request state is "0100", it indicates "exercise (EXER)". When the value of the request state is "0010", it indicates "reverse request (RR)". When the value of the request state is "0001", it indicates "do not revert (DNR)". When the value of the request state is "0000", it indicates "no request (NR)".

When the value of the A field is "0", the protection type indicates "no APS channel". When the value of the A field is "1", the protection type indicates "APS channel". When the value of the B field is "0", the protection type indicates "1+1 switch". When the value of the B field is "1", the protection type indicates "1:n switch". When the value of the C field is "0", the protection type indicates "Unidirectional Switching". When the value of the C field is "1", the protection type indicates "Bidirectional Switching". When the value of the D field is "0", the protection type indicates "Non-Revertive operation". When the value of the D field is "1", the protection type indicates "Revertive 0 operation".

The requested signal requests that another adjacent transmission apparatus 10 (for example, a near end (NEND) transmission apparatus 10) is to perform a transmission by switch transmission paths. On the other hand, the bridged signal is bridged by a switch of transmission paths. In any way, when the value is "0", it indicates "Null Signal". When the value is "1" through "254", it indicates "Normal Traffic Signal". When the value is "255", it indicates "Extra Traffic Signal".

As illustrated in FIG. 4, the MFAS 412 includes a 3-bit size monitoring level, a 5-bit size other information. The monitoring level corresponds to a concrete example of "section type information", and indicates to which segment the APS byte 411 corresponds (that is, indicates to which segment the OTN frame 40 including the APS byte 411 corresponds).

Concretely, as illustrated in FIG. 6, when the value of the monitoring level is "000", it indicates that the APS byte 411 corresponds to a path. When the value of the monitoring level is "001", it indicates that the APS byte 411 corresponds to the TCM1. When the value of the monitoring level is "010", it indicates that the APS byte 411 corresponds to the TCM2. When the value of the monitoring level is "011", it indicates that the APS byte 411 corresponds to the TCM3. When the value of the monitoring level is "100", it indicates that the APS byte 411 corresponds to the TCM4. When the value of the monitoring level is "101", it indicates that the APS byte 411 corresponds to the TCM5. When the value of the monitoring level is "110", it indicates that the APS byte 411 corresponds to the TCM6. When the value of the monitoring level is "111", it indicates that the APS byte 411 corresponds to a section. That is, by changing the value of the MFAS 412, the segment corresponding to the APS byte 411 may be changed for each OTN frame 40. That is, by changing the value of the MFAS 412, the APS byte 411 may be transmitted in a multi-frame.

(4) First Operation Example

Figure 7:
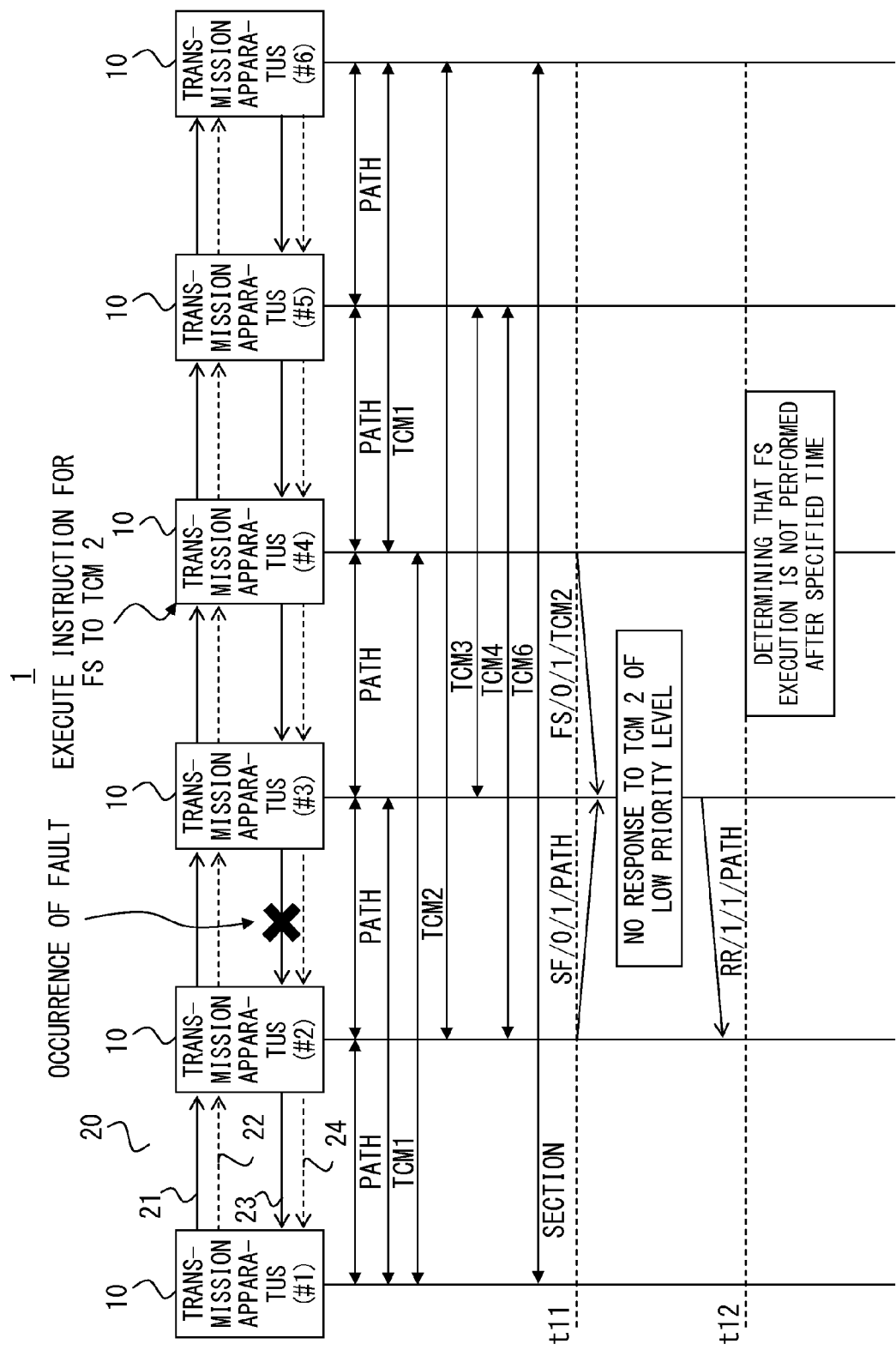
FIG. 7 illustrates a sequence of an example of the operation of the transmission apparatus corresponding to the first operation example.

The first operation example of the transmission apparatus 10 (first operation example of the transmission system 1) is described below with reference to FIGS. 7 and 8. FIG. 7 illustrates a sequence of an example of the operation of the transmission apparatus 10 corresponding to the first operation example. FIG. 8 is a table illustrating an example of the priority table used in the first operation example.

As illustrated in FIG. 7, the first operation example is described below using the example of the operation on the transmission system 1 in which six transmission apparatuses (concretely, the transmission apparatus (#1) 10, the transmission apparatus (#2) 10, the transmission apparatus (#3) 10, the transmission apparatus (#4) 10, the transmission apparatus (#5) 10, and the transmission apparatus (#6) 10) are interconnected through the liner transmission lines 20. To be more concrete, the first operation example is described using an example of the operation on the transmission system 1 in which the transmission apparatus (#1) 10 and the transmission apparatus (#2) 10 are connected through the liner transmission line 20, the transmission apparatus (#2) 10 and the transmission apparatus (#3) 10 are connected through the liner transmission line 20, the transmission apparatus (#3) 10 and the transmission apparatus (#4) 10 are connected through the liner transmission line 20, the transmission apparatus (#4) 10 and the transmission apparatus (#5) 10 are connected through the liner transmission line 20, the transmission apparatus (#5) 10 and the transmission apparatus (#6) 10 are connected through the liner transmission line 20.

In the transmission system 1 illustrated in FIG. 7, the TCM is set as follows. The TCM 1 is set between the transmission apparatus (#1) 10 and the transmission apparatus (#3) 10, and between the transmission apparatus (#4) 10 and the transmission apparatus (#6) 10. The TCM 2 is set between the transmission apparatus (#1) 10 and the transmission apparatus (#4) 10. The TCM 3 is set between the transmission apparatus (#2) 10 and the transmission apparatus (#6) 10. The TCM 4 is set between the transmission apparatus (#3) 10 and the transmission apparatus (#5) 10. The TCM 6 is set between the transmission apparatus (#2) 10 and the transmission apparatus (#5) 10. The path corresponds to the segment between the transmission apparatus (#1) 10 and the transmission apparatus (#2) 10, between the transmission apparatus (#2) 10 and the transmission apparatus (#3) 10, between the transmission apparatus (#3) 10 and the transmission apparatus (#4) 10, between the transmission apparatus (#4) 10 and the transmission apparatus (#5) 10, and between the transmission apparatus (#5) 10 and the transmission apparatus (#6) 10. The section corresponds to the segment between the transmission apparatus (#1) 10 and the transmission apparatus (#6) 10.

As illustrated in FIG. 7, for example, assume that there has occurred a fault in the current circuit 23 of the path from the transmission apparatus (#3) 10 to the transmission apparatus (#2) 10. The fault is detected by, for example, the current side fault detection unit 111 of the transmission apparatus (#2) 10. In addition, for example, assume that a switch command to the current circuit of the transmission path in the TCM 2 (that is, the TCM 2 which partly overlaps the path in which the above-mentioned fault has occurred) has been input to the transmission apparatus (#4) 10 through the command input unit 117 based on the FS (Forced Switch). In addition, assume that the switch of the transmission paths is performed by a bidirectional 1+1 switch. However, a switch by another method (for example, 1:n switch) may be performed for a similar operation.

In response to the fault which has occurred in the current circuit 23 from the transmission apparatus (#3) 10 to the transmission apparatus (#2) 10, the APS byte transmission/reception unit 116 of the transmission apparatus (#2) 10 transmits at time t11 to the transmission apparatus (#3) 10 the APS byte 411 including the request state "SF", the requested signal "0 (standby)", and the bridged signal "1 (current)". In this case, to indicate that the APS byte 411 corresponds to a path, the MFAS 412 of the GIN frame 40 including the APS byte 411 is set to the value "000" indicating a path. In the following explanation, for simple explanation, the APS byte 411 including the request state, the requested signal, and the bridged signal and the MFAS 412 including the monitoring level are collectively expressed as "(request state)/(requested signal)/(bridged signal)/(monitoring level)". Therefore, the APS byte 411 transmitted from the transmission apparatus (#2) 10 to the transmission apparatus (#3) 10 is expressed as "SF/0/1/path".

On the other hand, in response to the input of the command to switch the transmission paths in the TCM 2 based on the FS, the transmission apparatus (#4) 10 transmits the APS byte APS byte 411 "FS/1/0/TCM2" to the transmission apparatus (#3) 10 accommodated in the TCM 2 at time t11. The transmission apparatus (#4) 10 may transmit the APS byte 411 "FS/1/0 TCM2" to other transmission apparatus (#1) 10 and the transmission apparatus (#2) 10 accommodated in the TCM 2.

The APS byte 411 "SF/0/1/path" and the APS byte 411 "FS/1/0/TCM2" are transmitted to the transmission apparatus (#3) 10. That is, a plurality of switch requests (that is, transmissions of a plurality of APS bytes 411) for a plurality of partly overlapping segments are issued to the transmission apparatus (#3) 10. In the first operation example, the switch control unit 113 provided for the transmission apparatus (#3) 10 selects one of a plurality of switch requests for a plurality of partly overlapping segments as a switch request for practically switching the transmission paths based on the priority table 114 with the priority level of each of the plurality of segments taken into account. That is, the switch control unit 113 provided for the transmission apparatus (#3) 10 selects one of the plurality of APS bytes 411 for reference to practically switch the transmission path based on the priority table 114 with the priority of each of a plurality of segments.

FIG. 8 illustrates an example of the priority table 114 with the priority of each of a plurality of segments. As illustrated in FIG. 8, the priority of each of the plurality of segments is set in the priority table 114 so that a higher priority is assigned to the path, the TCM, and the section in this order in the same request state. Concretely, in the priority table 114, a higher priority is assigned to each of the plurality of segments in the order of the switch request of a path based on the LO, the switch request of the TCM based on the LO, the switch request of the section based on the LO, the switch request of the path based on the FS, the switch request of the path based on the SF, the switch request of the path based on the SD, the switch request of the TCM based on the FS, the switch request of the TCM based on the SF, the switch request of the TCM based on the SD, the switch request of the section based on the FS, the switch request of the section based on the SF, the switch request of the section based on the SD, the switch request of the path based on the MS, the switch request of the TCM based on the MS, the switch request of the section based on the MS, the switch request of the TCM based on the WTR, the switch request of the section based on the WTR, the switch request of the path based on the EXER, the switch request of the TCM based on the EXER, the switch request of the section based on the EXER, the switch request of the path based on the RR, the switch request of the TCM based on the RR, the switch request of the section based on the RR, the switch request of the path based on the DNR, the switch request of the TCM based on the DNR, the switch request of the section based on the DNR, the switch request of the path based on the NR, the switch request of the TCM based on the NR, and the switch request of the section based on the NR.

The setting mode of the priority illustrated in FIG. 8 is an example, and the priority of each segment may be arbitrarily set. In the OTN, the maximum of 6 TCMs (that is, the TCM 1 through TCM 6) may be set, thereby further setting the priority of each of the TCM 1 through TCM 6.

According to the priority table 114 in FIG. 8, it becomes clear that the priority of the APS byte 411 "SF/0/1/path" is higher than the priority of the APS byte 411 "FS/0/1/TCM2". Therefore, the switch control unit 113 provided for the transmission apparatus (#3) 10 performs a switch of transmission paths against the fault which has occurred in the current circuit 23 from the transmission apparatus (#3) 10 to the transmission apparatus (#2) 10. That is, the switch control unit 113 provided for the transmission apparatus (#3) 10 does not respond to the switch request of the transmission path in the TCM 2 based on the FS from the transmission apparatus (#4) 10. Therefore, the APS byte transmission/reception unit 116 provided for the transmission apparatus (#3) 10 transmits the APS byte 411 "RR/1/1/path" as a response to the transmission apparatus (#2) 10. As a result, the transmission path of the signal from the transmission apparatus (#3) 10 to the transmission apparatus (#2) 10 is switched from the current circuit 23 to the standby circuit 24.

On the other hand, it is preferable that the switch control unit 113 of the transmission apparatus (#4) 10 which has issued the switch request of the transmission path in the TCM 2 based on the FS determines that the transmission paths might not be switched when the APS byte 411 is not transmitted as a response within a specified time (concretely, for example, by time t12) after the transmission of the APS byte 411.

As described above, according to the first operation example, the transmission apparatus 10 may switch the transmission paths in response to any one switch request based on the priority table 114 with the priority of each of plural types of segments taken into account when a plurality of switch requests are issued for the plural types of segments (that is, a path, a TCM, and a section).

If the priority table 114 with the priority of each of the plural types of segments taken into account is not referenced, the priority of the request state "SF" may be lower than the priority of the request state "FS". Therefore, in the example in FIG. 7, the priority of the APS byte 411 "SF/0/1/path" may be lower than the priority of the APS byte 411 "FS/1/0/TCM2". Therefore, the switch to the current circuit is performed in the TCM 2. Therefore, since there has occurred a fault in the current circuit 23 of the path between the transmission apparatus (#2) 10 and the transmission apparatus (#3) 10 which partly overlaps the TCM 2, a transmission of a signal after the switch to the current circuit in the TCM 2 is not appropriately performed. Therefore, to perform an appropriate transmission in the TCM 2, it is preferable for the transmission apparatus 10 to switch transmission paths again. Therefore, it is assumed that not only the optimum switch is not performed, but also an unnecessary switch requests are repeatedly issued before the optimum switch is performed.

Thus, according to the present embodiment, although a plurality of switch requests are issued for plural types of segments, an appropriate switch of transmission paths is performed depending on the priority of each segment. That is, according to the above-mentioned transmission apparatus 10, the technological problems of a relatively long time taken to complete the switch of transmission paths (that is, to save the faulty circuit) depending on the order of performing a plurality of switch requests, no optimum switch to be performed, an unnecessary switch, etc. may be appropriately removed or suppressed.

FIG. 7 illustrates an example of the transmission apparatus (#3) 10 simultaneously receiving the APS byte 411 "SF/0/1/path" and the APS byte 411 "FS/0/1/TCM2". However, although both of the APS byte 411 "SF/0/1/path" and the APS byte 411 "FS/0/1/TCM2" are not simultaneously received (that is, when they are received in different timing), the above-mentioned effect may be acquired. Concretely, although a plurality of switch requests are issued to one transmission apparatus 10 in different timing for a plurality of segments part of which overlap each other, the above-mentioned effect may be acquired by comparing the priority of the newly received switch request with the priority of the previously received switch request.

(5) Second Operation Example

Figure 9:
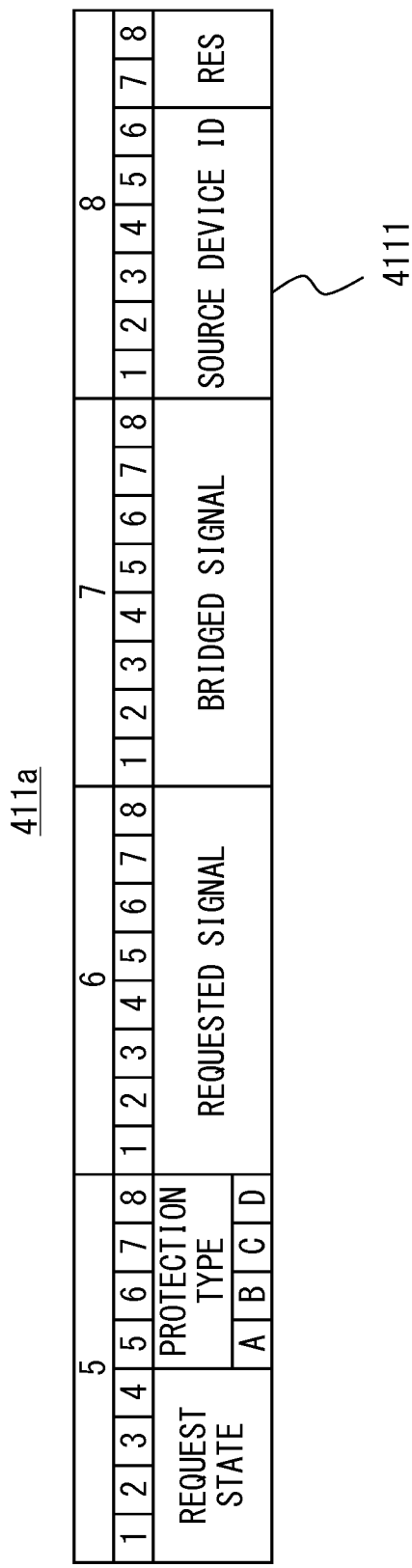
FIG. 9 is a data structure diagram of the data structure of the APS byte used in the second operation example.
Figure 10:
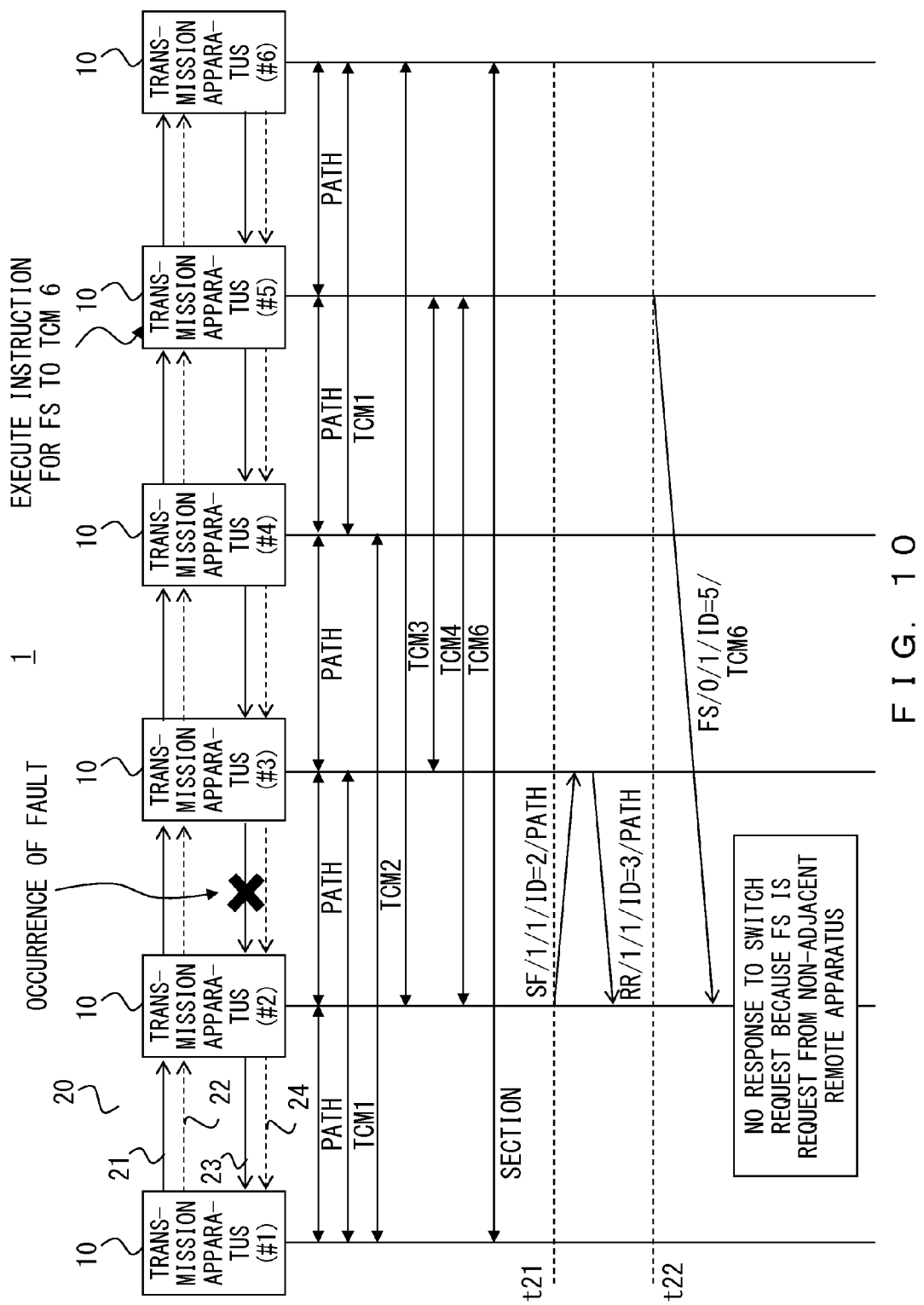
FIG. 10 illustrates a sequence of an example of the operation of the transmission apparatus corresponding to the second operation example.

The second operation example (second operation example of the transmission system 1) of the transmission apparatus 10 is described below with reference to FIGS. 9 through 12. FIG. 9 is a data structure diagram of the data structure of an APS byte 411a used in the second operation example. FIG. 10 illustrates a sequence of an example of the operation of the transmission apparatus 10 corresponding to the second operation example. FIGS. 11A and 11B are a table illustrating an example of the priority table 114a used in the second operation example. FIGS. 12A and 12B illustrate a sequence of another example of the operation of the transmission apparatus 10 corresponding to the second operation example.

As illustrated in FIG. 9, the APS byte 411a includes a source device ID 4111 for identification of the transmission apparatus 10 for transmission of the APS byte 411a in a part of the fields. The source device ID 4111 is an example of "position information" and "identification information". In the example illustrated in FIG. 9, an example of the APS byte 411a including the source device ID 4111 in the first bit through the sixth bit in the eighth column is disclosed. That is, in the example illustrated in FIG. 9, an example of including the source device ID 4111 for individually identifying the 2^6=64 transmission apparatuses in the APS byte 411a is disclosed.

It is preferable that the source device ID 4111 is included in the APS byte 411a in any of the cases when the 411a corresponds to a path, when the APS byte 411a corresponds to a TCM, and when the APS byte 411a corresponds to a section. However, the source device ID 4111 may be included in any field other than the APS byte 411a in the OTN frame 40.

The source device ID 4111 included in the APS byte 411a is used by the transmission apparatus 10 which has received the APS byte 411a when determining whether or not the received APS byte 411a has been transmitted from the adjacent transmission apparatus 10 (that is, the NEND (Near END) transmission apparatus 10). That is, the source device ID 4111 included in the APS byte 411a is used by the transmission apparatus 10 which has received the APS byte 411a when determining whether or not the received APS byte 411a has been transmitted from the non-adjacent farther transmission apparatus 10 (that is, the FEND (Far END) transmission apparatus 10). In the second operation example, the transmission apparatus 10 selects one of the plurality of received APS byte 411a as a APS byte 411a referenced for practical switch of transmission paths by considering, in addition to the priority of each of the plurality of segments, the priority depending on whether or not the APS byte 411a has been transmitted from the FEND transmission apparatus 10. That is, the transmission apparatus 10 selects one of the plurality of switch requests as a switch request for practical switch of transmission paths by considering, in addition to the priority of each of the plurality of segments, the priority depending on whether or not the switch request has been issued from the FEND transmission apparatus 10. The second operation example is described below with reference to a concrete example.

As illustrated in FIG. 10, the second operation example is described with reference to an example of the operation on the same transmission system 1 illustrated in FIG. 7. "X" indicated by the "transmission apparatus (#X (X=1 through 6))" in FIG. 10 refers to the device ID of each of the transmission apparatuses 10.

As illustrated in FIG. 10, for example, assume that a fault has occurred in the current circuit 23 of the path from the transmission apparatus (#3) 10 to the transmission apparatus (#2) 10. The fault is detected by, for example, the current side fault detection unit 111 of the transmission apparatus (#2) 10. In addition, for example, assume that a command to switch to the current circuit of the transmission path in the TCM 6 (that is, the TCM 6 partly overlapping the path in which the fault has occurred) based on the FS (Forced Switch) has been input to the transmission apparatus (#5) 10 through the command input unit 117.

In response to the fault which has occurred in the current circuit 23 from the transmission apparatus (#3) 10 to the transmission apparatus (#2) 10, the APS byte transmission/reception unit 116 of the transmission apparatus (#2) 10 transmits the APS byte 411a "SF/1/1/ID=2/path" to the transmission apparatus (#3) 10. In the following description, for simple explanation, the APS byte 411a including the request state, the requested signal, the bridged signal, and the source device ID 4111 and the MFAS 412 including the monitoring level are collectively expressed as "(request state)/(requested signal)/(bridged signal)/(source device ID 4111)/(monitoring level)".

Upon receipt of the APS byte 411a including the source device ID 4111, the switch control unit 113 provided for the transmission apparatus (#3) 10 recognizes that the device ID of the transmission apparatus 10 adjacent to the transmission apparatus (#3) 10 is "2". The switch control unit 113 provided for the transmission apparatus (#3) 10 switches the transmission paths against the fault which has occurred in the current circuit 23 from the transmission apparatus (#3) 10 to the transmission apparatus (#2) 10. That is, the transmission path of the signal from the transmission apparatus (#3) 10 to the transmission apparatus (#2) 10 is switched from the current circuit 23 to the standby circuit 24.

With the switch of the transmission paths, the APS byte transmission/reception unit 116 provided for the transmission apparatus (#3) 10 transmits the APS byte 411a "RR/1/1/ID=3/path" in response to the transmission apparatus (#2) 10. As a result, upon receipt of the APS byte 411a including the source device ID 4111, the switch control unit 113 provided for the transmission apparatus (#2) 10 recognizes that the device ID of the transmission apparatus 10 adjacent to the transmission apparatus (#2) 10 is "3".

On the other hand, in response to the input of a command to switch the transmission path in the TCM 6 based on the FS, the transmission apparatus (#5) 10 transmits the APS byte 411a "FS/0/1/ID=5/TCM6" to the transmission apparatus (#2) 10 accommodated in the TCM 6 as a terminal node (that is, the nodes on both sides other than the intermediate node) of the TCM 6 at time t22. The transmission apparatus (#5) 10 may transmit the APS byte 411a "FS/0/1/ID=5/TCM6" to other transmission apparatus (#3) 10 and the transmission apparatus (#4) 10 accommodated in the TCM 6.

As a result, the switch request based on the APS byte 411a "FS/0/1/ID=5/TCM6" is newly received in addition to the already transmitted switch request based on the APS byte 411a "SF/1/1/ID=2/path". In the second operation example, the switch control unit 113 provided for the transmission apparatus (#2) 10 selects one of the plurality of switch requests for a plurality of partly overlapping segments as a switch request for practical switch of transmission paths based on a priority table 114a with the priority of each of the plurality of segments and the priority depending on whether or not the APS byte 411a has been transmitted from the FEND transmission apparatus 10 taken into account.

FIGS. 11A and 11B are an example of the priority table 114a with the priority of each of a plurality of segments and the priority depending on whether or not the APS byte 411a has been transmitted from the FEND transmission apparatus 10 taken into account. As illustrated in FIGS. 11A and 11B, the priority table 114a adopts the order of the priority table illustrated in FIG. 8 relating to the order of the priority of a request state itself. On the other hand, as illustrated in FIGS. 11A and 11B, the priority is set in the priority table 114a depending on whether or not the APS byte 411a has been transmitted from the FEND transmission apparatus 10 so that the priority becomes lower in the order of a path, a TCM, a TCM (FEND), a section, and a section (FEND). That is, in the priority table 114a, the priority when the APS byte 411a is transmitted from the FEND transmission apparatus 10 is lower than the priority when the APS byte 411a is transmitted from the NEND. That is, in the priority table 114a, the priority is set depending on whether or not the APS byte 411a has been transmitted from the FEND transmission apparatus 10 so that the priority becomes lower in the order of the switch request of a path, the switch request of a TCM from the NEND transmission apparatus 10, the switch request of a TCM from the FEND transmission apparatus 10, the switch request of a section from the NEND transmission apparatus 10, and the switch request of a section from the FEND transmission apparatus 10.

The setting mode of the priority illustrated in FIGS. 11A and 11B is only an example, and the priority of each segment and the priority depending on whether or not the APS byte 411a has been transmitted from the FEND transmission apparatus 10 may be set so that an arbitrary priority is assigned.

With reference to the source device ID 4111 included in the APS byte 411a "FS/0/1/ID=5/TCM6", the switch control unit 113 of the transmission apparatus (#2) 10 recognizes that the APS byte 411a has been transmitted from the FEND transmission apparatus (#5) 10. According to the priority table 114a in FIGS. 11A and 11B, it becomes clear that the priority of the APS byte 411 "SF/1/1/ID=2/path" is higher than the priority of the APS byte 411 "FS/0/1/ID=5/TCM6 (FEND)". Therefore, the switch control unit 113 provided for the transmission apparatus (#2) 10 does not respond to the request to switch the transmission path in the TCM 6 based on the FS from the transmission apparatus (#5) 10.

Otherwise, as illustrated in FIGS. 12A and 12B, described below is the case in which a command to switch the transmission path to the current circuit in the TCM 6 based on the LO (Lookout of Protection) is input to the transmission apparatus (#3) 10 instead of inputting a command to switch the transmission path in the TCM 6 to the current circuit based on the FS (Forced Switch) to the transmission apparatus (#5) 10. The transmission system transmission system 1 illustrated in FIGS. 12A and 12B is different from the transmission system 1 illustrated in FIG. 10 in that the TCM 6 is set between the transmission apparatus (#2) 10 and the transmission apparatus (#3) 10.

As illustrated in FIGS. 12A and 12B, for the fault which has occurred in the current circuit 23 from the transmission apparatus (#3) 10 to the transmission apparatus (#2) 10, the transmission path of a signal from the transmission apparatus (#3) 10 to the n210 is switched from the current circuit 23 to the standby circuit 24 as in the aspect illustrated in FIG. 10.

On the other hand, in response to the input of the command to switch transmission paths in the TCM 6 based on the LO, the transmission apparatus (#3) 10 transmits the APS byte 411a "LO/0/1/ID+3/TCM6" to the transmission apparatus (#2) 10 as the terminal node in the TCM 6 accommodated in the TCM 6 (that is, the nodes at both ends other than the intermediate node) at time t22.

As a result, in the transmission apparatus (#2) 10, there newly occurs a switch request based on the APS byte 411a "LO/0/1/ID=3/TCM6" in addition to the previously received switch request based on the APS byte 411a "SF/1/1/ID=2/path". The switch control unit 113 of the transmission apparatus (#2) 10 refers to the source device ID 4111 included in the APS byte 411a "LO/0/1/ID=3/TCM6", and recognizes that the APS byte 411a has been transmitted from the NEND transmission apparatus (#2) 10. According to the priority table 114a illustrated in FIGS. 11A and 11B, it becomes clear that the priority of the APS byte 411 "SF/1/1/ID=2/path" is lower than the priority of the APS byte 411 "LO/0/1/ID=3/TCM6 (FEND)". Therefore, the switch control unit 113 provided for the transmission apparatus (#2) 10 responds to the switch request of transmission paths in the TCM 6 based on the LO from the transmission apparatus (#3) 10. Therefore, the APS byte transmission/reception unit 116 provided for the transmission apparatus (#2) 10 transmits the APS byte 411a "RR/0/0/ID=2/TCM6" as a response to the transmission apparatus (#3).

On the other hand, in the path in which the transmission paths have been switched, no switch is performed. Therefore, the APS byte transmission/reception unit 116 provided for the transmission apparatus (#2) 10 transmits the APS byte 411a "SF/1/0/ID=2/path" as a response to the transmission apparatus (#3) 10. Since no switch is performed for the path, the APS byte transmission/reception unit 116 provided for the transmission apparatus (#3) 10 which has received the APS byte 411a transmits the APS byte 411a "NR/0/0/ID=3/path" as a response to the transmission apparatus (#2) 10 for the path.

As described above, according to the second operation example as with the first operation example, when a plurality of switch request are issued for plural types of segments (that is, a path, a TCM, and a section), the transmission apparatus 10 may switch transmission paths depending on any one switch request based on the priority table 114 with the priority of each of the plural types of segments taken into account.

According to the second operation example, the transmission apparatus 10 (for example, the transmission apparatus 10 for terminating the TCM, and the transmission apparatus (#2) 10 etc. in FIGS. 10 and 12) may select one switch request of a plurality of switch requests depending on whether or not the switch request (or a transmission of the APS byte 411a) is transmitted by the FEND transmission apparatus 10. Therefore, when a transmission path is switched in a higher priority path, it is not necessary for the transmission apparatus 10 to switch the transmission paths for the TCM or the section which is requested by a lower priority FEND transmission apparatus 10. Otherwise, when the transmission apparatus 10 switches the transmission paths in the TCM or the section which is requested by a higher priority NEND transmission apparatus 10, it is not necessary that the apparatus switches the transmission paths for the TCM or the section which is request by a lower priority FEND transmission apparatus 10. Therefore, an undesired influence of a switch request for a TCM or a section covering a plurality of paths on a switch request for a path partly overlapping the TCM or the section may be removed or reduced. That is, the transmission apparatus 10 which terminates a TCM or a section covering a plurality of paths does not perform an unnecessary switch which has an undesired influence on the switch of the transmission paths performed in the intermediate path partly overlapping the TCM or the section. Therefore, the transmission apparatus 10 may more appropriately perform a switch of transmission paths.

(6) Third Operation Example

Figure 13:
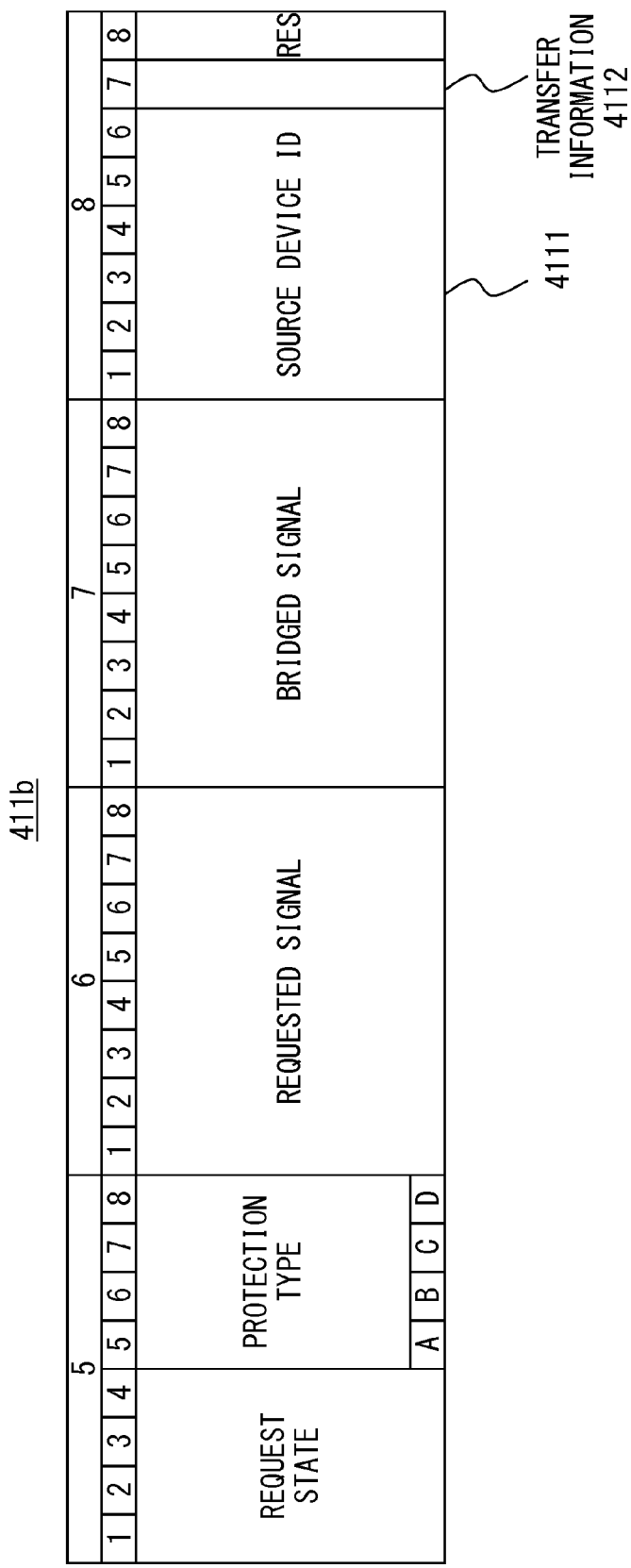
FIG. 13 is a data structure diagram of the data structure of the APS byte used in the third operation example.
Figure 14:
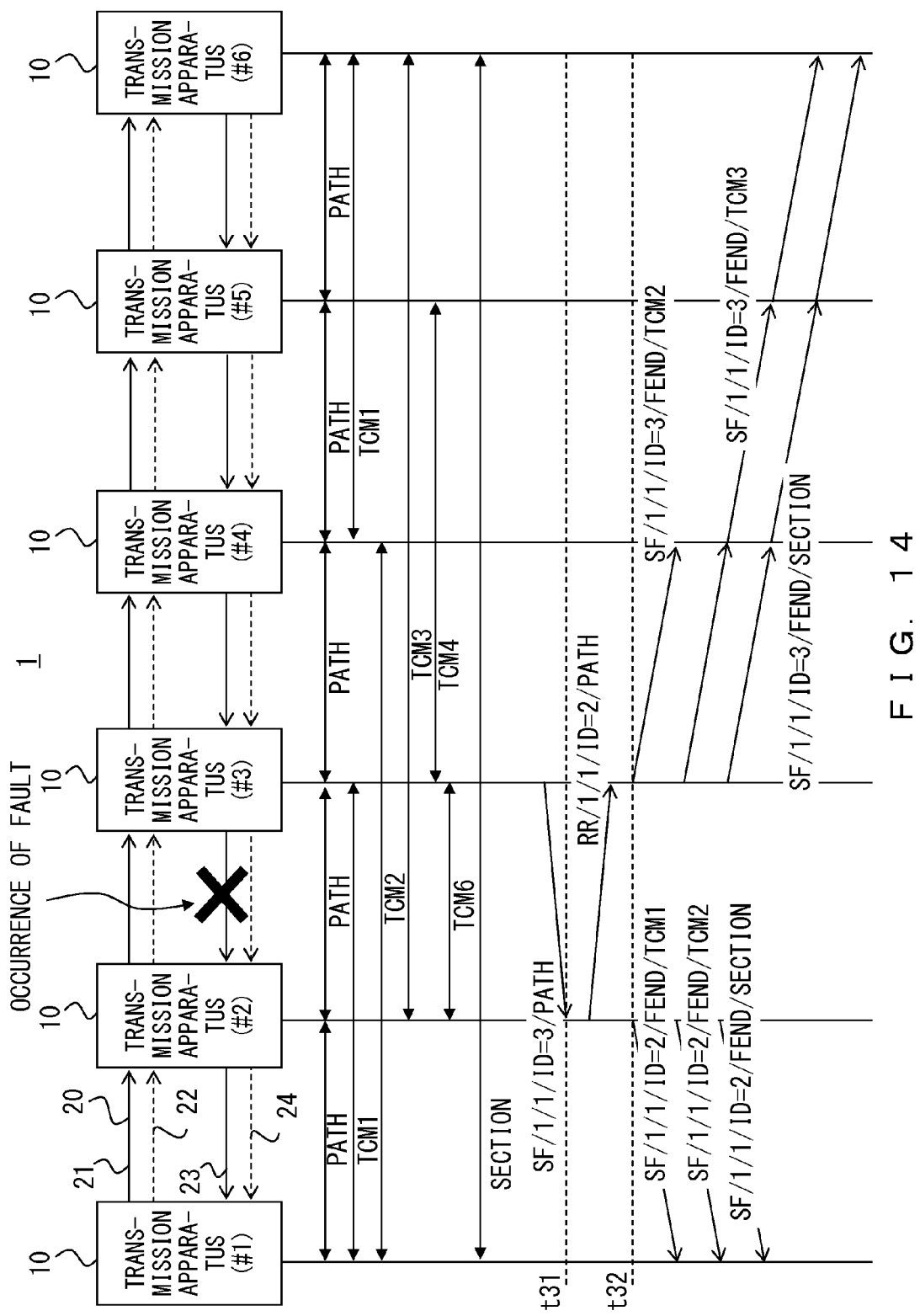
FIG. 14 illustrates a sequence of an example of the operation of the transmission apparatus corresponding to the third operation example.
Figure 15A:
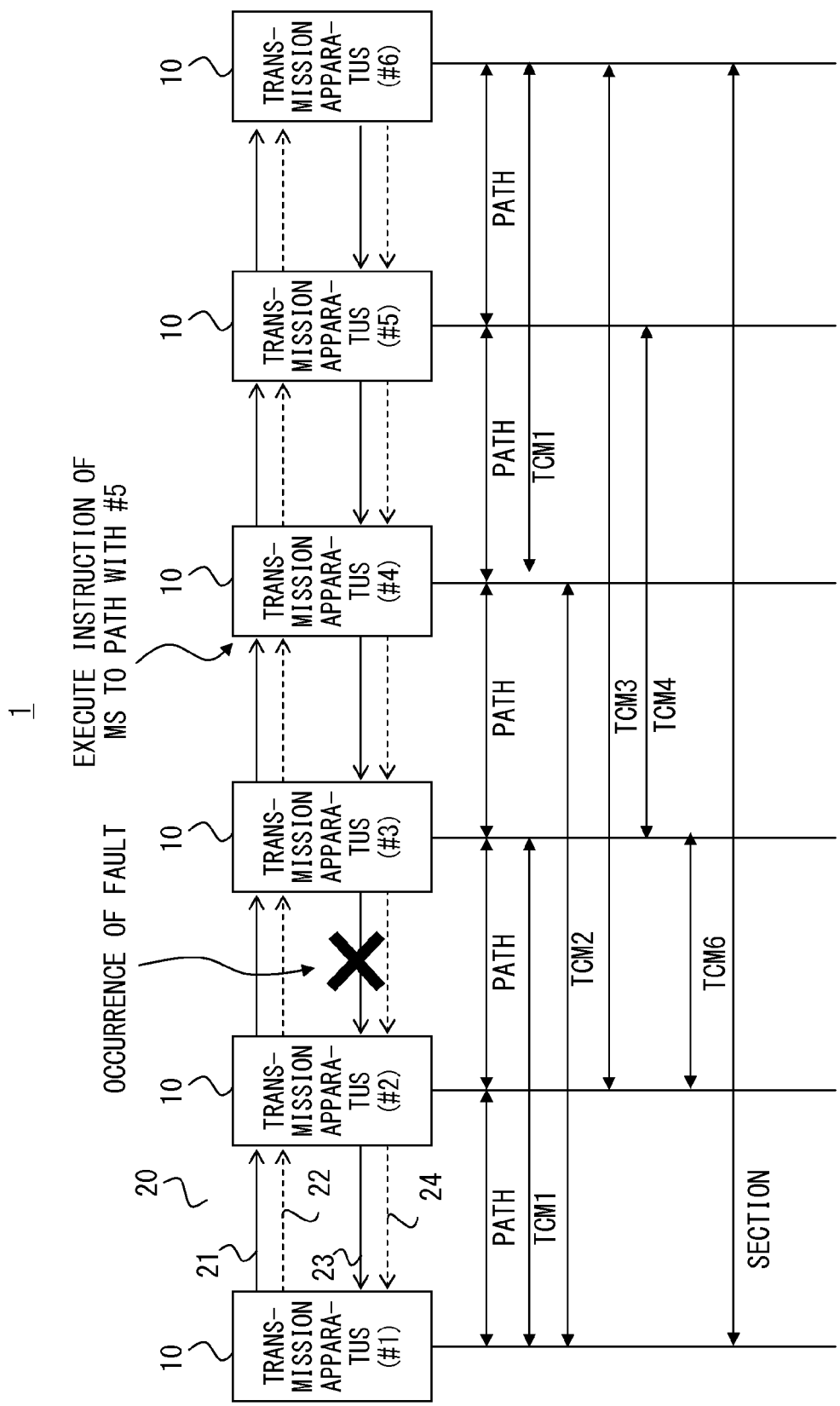

The third operation example (the third operation example of the transmission system 1) of the transmission apparatus 10 is described with reference to FIGS. 13 through 15. FIG. 13 is a data structure diagram of the data structure of the APS byte 411b used in the third operation example. FIG. 14 illustrates a sequence of an example of the operation of the transmission apparatus 10 corresponding to the third operation example. FIGS. 15A and 15B illustrate a sequence of another example of the operation of the transmission apparatus 10 corresponding to the third operation example.

As illustrated in FIG. 13, in the third operation example, an APS byte 411b includes in a part of the fields the source device ID 4111 for identification of the transmission apparatus 10 for transmission of the APS byte 411b, and transfer information 4112 for identification relating to which the APS byte 411b refers to, the switch request itself or the notification to another transmission apparatus about the switch. In the example in FIG. 9, the APS byte 411b includes the source device ID 4111 in the first through sixth bits in the eighth column, and the transfer information 4112 in the seventh bit in the eighth column. That is, in the example illustrated in FIG. 9, the transfer information 4112 discloses an example of a 1-bit flag. For example, when the transfer information 4112 refers to "0 (NEND)", the APS byte 411b refers to a switch request (that is, the transmission apparatus 10 which receives the APS byte 411b is requested to switch the transmission paths). On the other hand, when the transfer information 4112 refers to "1 (FEND)", the APS byte 411b notifies the transmission apparatus 10 that a switch indicated by the APS byte 411 is performed.

As for the source device ID 4111 included in the APS byte 411b, as with the second operation example, it is used by the transmission apparatus 10 determining whether or not the received APS byte 411b has been transmitted from the NEND or FEND transmission apparatus 10. The source device ID 4111 included in the APS byte 411b may be used by the transmission apparatus 10 which has received the APS byte 411b when it determines from which transmission apparatus 10 the received APS byte 411b has been transmitted.

The transfer information 4112 included in the APS byte 411b is used by the transmission apparatus 10 which has received the APS byte 411b when it determines that the transmission paths are switched depending on the received APS byte 411b, or it is recognized that another transmission apparatus 10 performs a switch of transmission paths depending on the received APS byte 411b. For example, if the transfer information 4112 is "0", the transmission apparatus 10 determines to switch the transmission paths depending on the received APS byte 411b (for example, the switch based on the first and second operation example, etc.). On the other hand, for example, if the transfer information 4112 is "1", the transmission apparatus 10 determine only to recognize that another transmission apparatus 10 switches the transmission paths depending on the received APS byte 411b. It is preferable that the transmission apparatus 10 compares the priorities between the switch requests based on the APS byte 411 and the command to be newly transmitted or received by referring to the priority table 114 or the priority table 114a relating to the switch of transmission paths performed by another transmission apparatus 10 recognized with reference to the transfer information 4112. That is, it is preferable that the transmission apparatus 10 determines whether or not the switch of the transmission paths to be performed by the switch request according to the newly transmitted or received APS byte 411 and command is to be performed on a priority basis over the switch of the transmission paths being performed by another transmission apparatus 10.

It is preferable that the transmission of the APS byte 411b after setting the transfer information 4112 as "1" is performed by the transmission apparatus 10 corresponding to the intermediate node of the TCM or the section (that is, the terminal node or a node other than the end nodes). In addition, it is preferable that the transmission of the APS byte 411b after setting the transfer information 4112 as "1" is performed by the transmission apparatus 10 which is the transmission apparatus 10 corresponding to the intermediate node of the TCM or the section, and switches the transmission paths in the path. It is obvious that any transmission apparatus 10 which actually switches the transmission paths may transmit the APS byte 411b after setting the transfer information 4112 as "1".

As illustrated in FIG. 14, the third operation example is described with reference to an example of the operation on the same transmission system 1 illustrated in FIGS. 12A and 12B. "X" indicated by the "transmission apparatus (#X (X=1 through 6))" in FIG. 14 refers to the device ID of each transmission apparatus 10.

As illustrated in FIG. 14, assume that, for example, there occurs a fault in the current circuit 23 of the path from the transmission apparatus (#3) 10 to the transmission apparatus (#2) 10. The fault is detected by, for example, the current side fault detection unit 111 of the transmission apparatus (#3) 10. In response to the fault which has occurred in the current circuit 23 from the transmission apparatus (#3) 10 to the transmission apparatus (#2) 10, the APS byte transmission/reception unit 116 of the transmission apparatus (#3) 10, the APS byte transmission/reception unit 116 of the transmission apparatus (#3) 10 transmits the APS byte 411b "SF/1/1/ID=3/NEND (0)/path" to the transmission apparatus (#2) 10 at time t31. In the following explanation, for simple explanation, the request state, the requested signal, the bridged signal, the APS byte 411a including the source device ID 4111 and the transfer information 4112 and the MFAS 412 including the monitoring level are collectively expressed as "(request state)/(requested signal)/(bridged signal)/(source device ID 4111)/(transfer information 4112)/( )".

Upon receipt of the APS byte 411b including the source device ID 4111, the switch control unit 113 provided for the transmission apparatus (#2) 10 recognizes that the device ID of the transmission apparatus 10 adjacent to the transmission apparatus (#2) 10 is "3". In addition, upon receipt of the APS byte 411b whose transfer information 4112 is "0", the switch control unit 113 provided for the transmission apparatus (#2) 10 determines to switch the transmission paths depending on the received APS byte 411b. That is, the switch control unit 113 for the transmission apparatus (#2) 10 switches the transmission paths against the fault which has occurred in the current circuit 23 from the transmission apparatus (#2) 10 to the transmission apparatus (#3) 10. Therefore, the transmission path of the signal from the n310 to the transmission apparatus (#2) 10 is switched from the current circuit 23 to the standby circuit 24.

With the switch of the transmission paths, the APS byte transmission/reception unit 116 for the transmission apparatus (#2) 10 transmits the APS byte 411b "RR/1/1/ID=2/NEND (0)/path" as a response to the transmission apparatus (#3) 10. As a result, upon receipt of the APS byte 411b including the source device ID 4111, the switch control unit 113 provided for the transmission apparatus (#3) 10 recognizes that the device ID of the transmission apparatus 10 adjacent to the transmission apparatus (#3) 10 is "2".

Afterwards, at time t32, the transmission apparatus (#2) 10 notifies another transmission apparatus 10 accommodated in the TCM or the section which accommodates the transmission apparatus (#2) 10 as an intermediate node that the transmission paths are switched for a path. The notification is performed by a transmission of the APS byte 411b whose transfer information 4112 is "1". Concretely, in the example illustrated in FIG. 14, the transmission apparatus (#2) 10 is accommodated in the TCM 2 and the section as an intermediate node. Therefore, the APS byte transmission/reception unit 116 for the transmission apparatus (#2) 10 transmits the APS byte 411b "SF/1/1/ID=2/FEND (1)/TCM1" to another transmission apparatus 10 accommodated in the TCM 1 (for example, the transmission apparatus (#1) 10). It is preferable that the APS byte transmission/reception unit 116 provided for the transmission apparatus (#2) 10 transmits the APS byte 411b "SF/1/1/ID=2/FEND (1)/TCM2" to another transmission apparatus 10 accommodated in the TCM 2 (for example, the transmission apparatus (#1) 10). The APS byte transmission/reception unit 116 provided for the transmission apparatus (#2) 10 transmits the APS byte 411b "SF/1/1/ID=2/FEND (1)/section" to another transmission apparatus 10 accommodated in the section (for example, the transmission apparatus (#1) 10).

As a result, for example, the transmission apparatus (#1) 10 may recognize that a switch of the transmission paths is performed based on the SF in at least a part of region (for example, a path) in the TCM 1, the TCM 2, and the sections. That is, the transmission apparatus (#1) 10 may recognize the presence/absence of the switch of the transmission paths in at least a part of region (for example, a path) in the TCM 1, the TCM 2, and the sections for which it is not capable of or recognizing or difficult to directly recognize. Therefore, the transmission apparatus (#1) 10 may selectively switch the transmission paths in the TCM 1, the TCM 2, and the sections by considering the presence/absence of the switch of the transmission paths for the path overlapping the TCM 1, TCM 2, and the sections when it is possible to switch the transmission paths or when there is no undesired influence of the switch of the transmission paths. Therefore, an appropriate switch of transmission paths is performed.

Similarly, the transmission apparatus (#3) 10 notifies another transmission apparatus 10 accommodated in the TCM or the section which accommodates the transmission apparatus (#3) 10 as an intermediate node that the transmission paths are switched for a path at time t32. The notification is issued by transmitting the APS byte 411b whose transfer information 4112 by the APS byte transmission/reception unit 116 is "1". Concretely, in the example in FIG. 14, the transmission apparatus (#3) 10 is accommodated as an intermediate node in the TCM 2, the TCM 3, and the sections. Therefore, the APS byte transmission/reception unit 116 provided for the transmission apparatus (#3) 10 transmits the APS byte 411b "SF/1/1/ID=3/FEND (1)/TCM2" to another transmission apparatus 10 accommodated in the TCM 2 (for example, the transmission apparatus (#4) 10). The APS byte transmission/reception unit 116 provided for the transmission apparatus (#3) 10 transmits the APS byte 411b "SF/1/1/ID=3/FEND (1)/TCM3" to another transmission apparatus 10 accommodated in the TCM 3 (for example, the transmission apparatus (#4) 10, the transmission apparatus (#5) 10, and the transmission apparatus (#6) 10). The APS byte transmission/reception unit 116 provided for the transmission apparatus (#3) 10 transmits the APS byte 411b "SF/1/1/ID=3/FEND (1)/section" to another transmission apparatus 10 accommodated in the section (for example, the transmission apparatus (#4) 10, the transmission apparatus (#5) 10, and the transmission apparatus (#6) 10.

As a result, for example, the transmission apparatus (#4) 10 may recognize that a switch of transmission paths is performed based on the SF in at least a part of region (for example, a path) in the TCM 2, the TCM 3, and the section. Therefore, the transmission apparatus (#4) 10 may selectively switch the transmission paths in the TCM 2, the TCM 3, and the sections by considering the presence/absence of the switch of the transmission paths for the path overlapping the TCM 2, TCM 3, and the sections when it is possible to switch the transmission paths or when there is no undesired influence of the switch of the transmission paths. Therefore, an appropriate switch of transmission paths is performed.

Similarly, for example, the transmission apparatus (#5) 10 and the transmission apparatus (#6) 10 may recognize that a switch of transmission paths is performed based on the SF in at least a part of region (for example, a path) in the TCM 3 and the section. Therefore, the transmission apparatus (#5) 10 and the transmission apparatus (#6) 10 may selectively switch the transmission paths in the TCM 3 and the sections by considering the presence/absence of the switch of the transmission paths for the path overlapping the TCM 2, TCM 3, and the sections when it is possible to switch the transmission paths or when there is no undesired influence of the switch of the transmission paths. Therefore, an appropriate switch of transmission paths is performed.

When a switch of transmission paths is performed depending on the request state of a relatively low priority, the transmission apparatus 10 might not notify another transmission apparatus 10 that the transmission paths are switched using the APS byte 411b including the transfer information 4112 set as "1". That is, the transmission apparatus 10 may notify another transmission apparatus 10 that transmission paths are switched using the APS byte 411b including the transfer information 4112 set as "1" when the transmission paths are switched depending on a part of request state having a relatively high priority (for example, the LO, the FS, the SF, and the SD). With the notification, since the notification that the transmission paths are switched depending on the request state having a low priority is not transmitted, the communication load on the liner transmission line 20 may be reduced.

When a switch of transmission paths are performed depending on the rest state having a relatively low priority, the transmission apparatus 10 may transfer the APS byte 411b having a relatively high priority notified from another transmission apparatus 10 may be transferred as is to the transmission apparatus 10. Concretely, an example of the operation on the transmission system 1 illustrated in FIGS. 15A and 15B is described below.

As illustrated in FIGS. 15A and 15B, described is the case in which after a switch of the transmission paths in FIG. 14 is made and the notification that a switch of transmission paths is made is transmitted, a switch command to the current circuit of the transmission path in the path between the transmission apparatus (#4) 10 and the transmission apparatus (#5) 10 is input based on the MS (manual switch) to the transmission apparatus (#4) 10.

As described in FIGS. 15A and 15B, in response to the input of the switch command of the transmission paths through the path based on the MS, the transmission apparatus (#4) 10 transmits the APS byte 411b "MS/0/1/ID=4/NEND (0)/path" to the transmission apparatus (#5) 10 at time t33.

Upon receipt of the APS byte 411b including the source device ID 4111, the switch control unit 113 provided for the transmission apparatus (#5) 10 recognizes that the device ID of the transmission apparatus 10 adjacent to the transmission apparatus (#5) 10 is "4" In addition, upon receipt of the APS byte 411*b* in which the transfer information 4112 is "0", the switch control unit 113 provided for the transmission apparatus (#5) 10 determines that a switch of transmission paths is performed depending on the received APS byte 411*b*. That is, the switch control unit 113 provided for the transmission apparatus (#5) 10 switches the transmission paths by the path between the transmission apparatus (#4) 10 and the transmission apparatus (#5) 10.

With the switch of the transmission paths, the APS byte transmission/reception unit 116 provided for the transmission apparatus (#5) 10 transmits the APS byte 411*b* "RR/1/1/ID=5/NEND (0)/path" as a response to the transmission apparatus (#4) 10. As a result, upon receipt of the APS byte 411*b* including the ID411, the switch control unit 113 provided for the transmission apparatus (#4) 10 recognizes that the device ID of the transmission apparatus 10 adjacent to the transmission apparatus (#4) 10 is "5".

While a switch of transmission paths is performed, each of the transmission apparatus (#4) 10 and the transmission apparatus (#5) 10 receives from the transmission apparatus (#3) 10 the APS byte 411*b* "SF/1/1/ID=3/FEND (1)/TCM3" and the APS byte 411*b* "SF/1/1/ID=3/FEND (1)/section". According to the priority table 114 in FIG. 8, each of the transmission apparatus (#4) 10 and the transmission apparatus (#5) 10 determines that the priorities of the APS byte 411*b* "SF/1/1/ID=3/FEND (1)/TCM3" and the APS byte 411*b* "SF/1/1/ID=3/FEND (1)/section" are higher than the priority of the APS byte 411*b* "MS/0/1/ID=4/NEND (0)/path". Therefore, each of the transmission apparatus (#4) 10 and the transmission apparatus (#5) 10 transfers to another transmission apparatus 10 the APS byte 411*b* "SF/1/1/ID=3/FEND (1)/TCM3" and the APS byte 411*b* "SF/1/1/ID=3/FEND (1)/section" that transferred from the transmission apparatus (#3) 10. That is, the transmission apparatus (#4) 10 might not transfer to another transmission apparatus 10 the APS byte 411*b* "MS/1/1/ID=4/FEND (1)/TCM3" (refer to the dotted arrow in FIGS. 15A and 15B) for notification of a switch of the transmission paths in a path based on the MS to another transmission apparatus 10, and the APS byte 411*b* "MS/1/1/ID=4/FEND (1)/section" (refer to the dotted arrow in FIGS. 15A and 15B). Similarly, the transmission apparatus (#5) might not transfer to another transmission apparatus 10 the APS byte 411*b* "MS/1/1/ID=5/FEND (1)/TCM3" for notification of a switch of the transmission paths in a path based on the MS to another transmission apparatus 10, and the APS byte 411*b* "MS/1/1/ID=5/FEND (1)/section".

The transmission apparatus (#4) 10 is accommodated as an intermediate node in the TCM 4 in addition to the TCM 3 and the section. On the other hand, in the TCM 4, the APS byte 411*b* having a high priority is not transmitted from the transmission apparatus (#3) 10. Therefore, the APS byte transmission/reception unit 116 provided for the transmission apparatus (#4) 10 may transmit the APS byte 411*b* "MS/1/1/ID=4/FEND (1)/TCM4" to another transmission apparatus 10 (for example, the transmission apparatus (#3) 10. Similarly, the transmission apparatus (#5) 10 is accommodated as an intermediate node in the TCM 1 in addition to the TCM 3 and the section. On the other hand, in the TCM 1, the APS byte 411*b* having a high priority is not transmitted from the transmission apparatus (#3) 10. Therefore, the APS byte transmission/reception unit 116 provided for the transmission apparatus (#5) 10 may transmit the APS byte 411*b* "MS/1/1/ID=5/FEND (1)/TCM1" to another transmission apparatus 10 (for example, the transmission apparatus (#6) 10.

(7) Fourth Operation Example

Figure 16A:
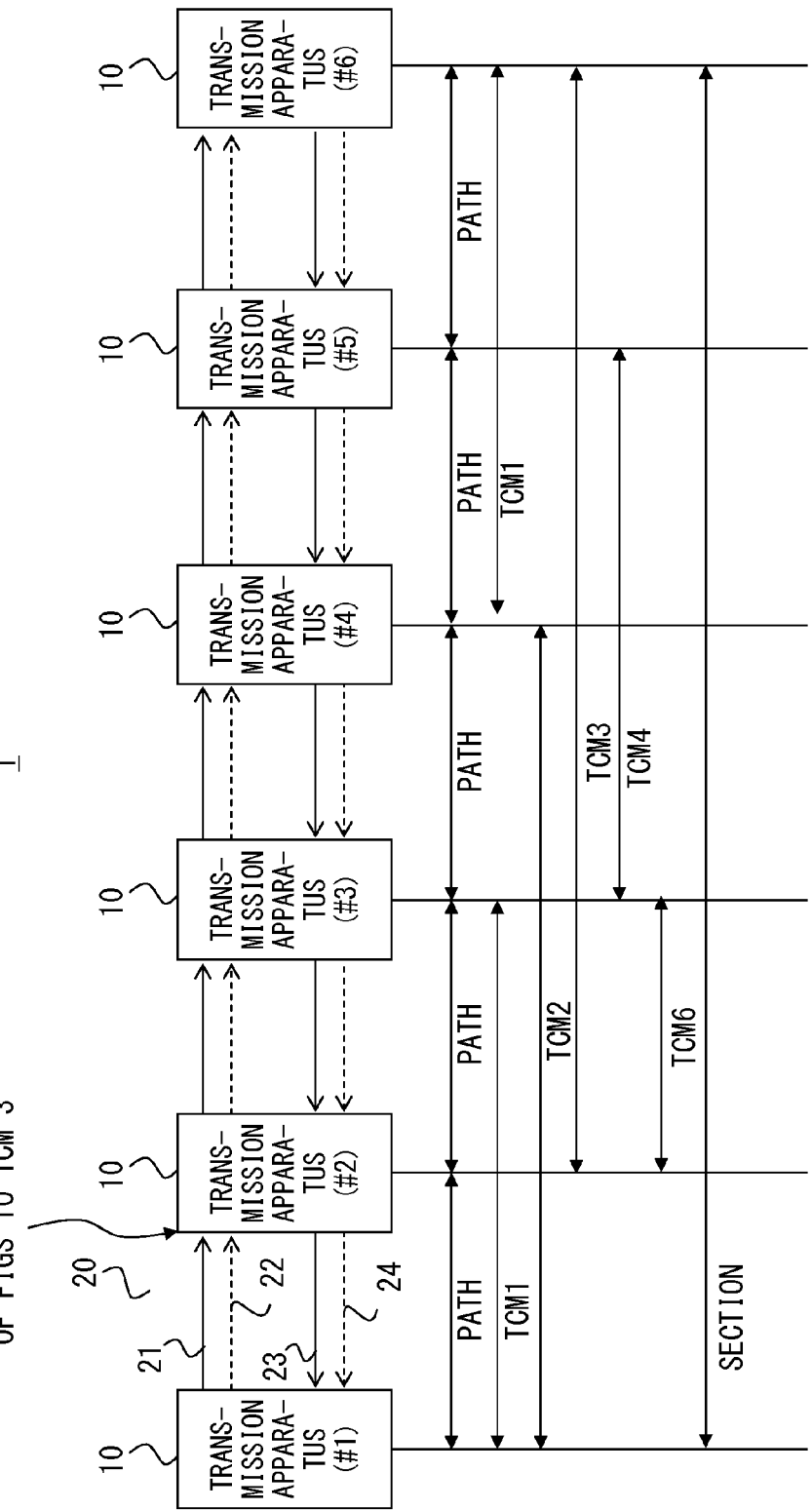
FIGS. 16A and 16B is a sequence of an example of the operation of the transmission apparatus corresponding to the fourth operation example.
Figure 16B:
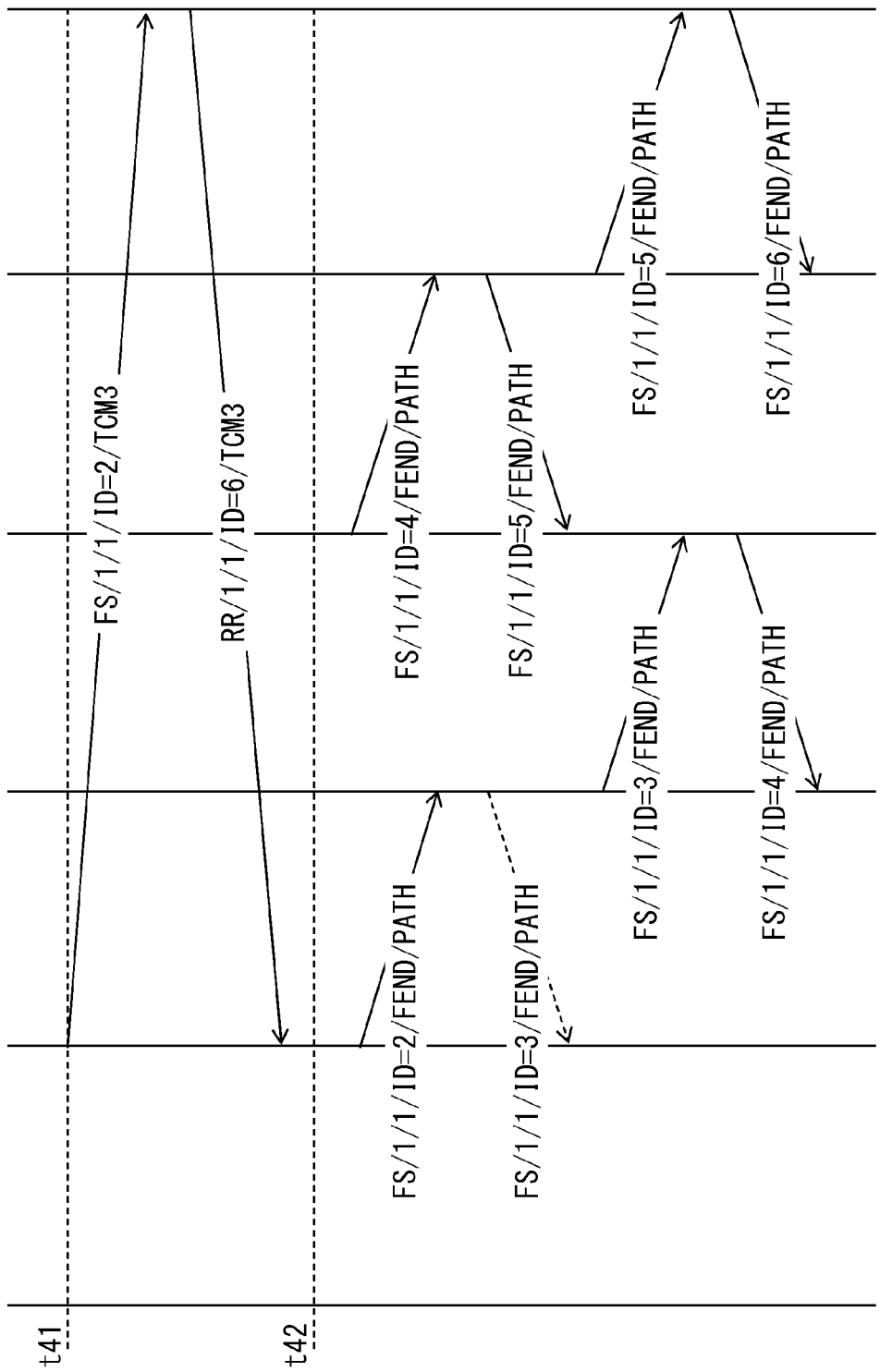

With reference to FIGS. 16A and 16B, the fourth operation example of the transmission apparatus 10 (fourth operation example of the transmission system 1) is described below. FIGS. 16A and 16B are a sequence of an example of the operation of the transmission apparatus 10 corresponding to the fourth operation example.

In the fourth operation example, the transmission apparatus 10 which switches transmission paths in the TCM or the section notifies the path of the APS byte 411*b*, thereby notifying the path that the transmission paths are switched. The fourth operation example is described below with reference to the operations on the same transmission system 1 illustrated in FIGS. 12A and 12B is described below with reference to FIGS. 16A and 16B.

As illustrated in FIGS. 16A and 16B, assume that a command to switch transmission paths in the TCM 3 is input based on the FS (forced switch) to the transmission apparatus (#2) 10. At time t41, in response to the input of the command to switch the transmission paths in the TCM 3 based on the FS, the transmission apparatus (#2) 10 transmits the APS byte 411*b* "FS/1/1/ID=2/NEND (0)/TCM3" to the transmission apparatus (#6) 10 (or the TCM 3) which terminates the TCM 3. Upon receipt of the APS byte 411*b* whose transfer information 4112 is "0", the switch control unit 113 provided for the transmission apparatus (#6) 10 determines to switch transmission paths depending on the APS byte 411*b*. That is, the switch control unit 113 provided for the transmission apparatus (#6) 10 switches the transmission paths in the TCM 3. With the switch of transmission paths, the APS byte transmission/reception unit 116 provided for the transmission apparatus (#6) 10 transmits the APS byte 411*b* "RR/1/1/ID=6/NEND (0)/TCM3" in response to the transmission apparatus (#2) 10.

The switch of the transmission paths above is performed in the hierarchical layer of the TCM 3. However, in the fourth operation example, the transmission apparatus 10 accommodated in the TCM 3 notifies the path in which each transmission apparatus 10 is superposed (that is, to another adjacent transmission apparatus 10 through a path) that the switch of the transmission paths is performed in the TCM 3 above. Concretely, the TCM 3 accommodates the transmission apparatus (#2) 10, the transmission apparatus (#3) 10, the transmission apparatus (#4) 10, the transmission apparatus (#5) 10, and the transmission apparatus (#6) 10. Therefore, the APS byte transmission/reception unit 116 provided for the transmission apparatus (#2) 10 transmits the APS byte 411*b* "SF/1/1/ID=2/FEND (1)/path" to the transmission apparatus (#3) 10. The APS byte transmission/reception unit 116 provided for the transmission apparatus (#3) 10 transmits the APS byte 411*b* "SF/1/1/ID=3/FEND (1)/path" to the transmission apparatus (#4) 10. The APS byte transmission/reception unit 116 provided for the transmission apparatus (#4) 10 transmits the APS byte 411*b* "FS/1/1/ID=4 FEND (1)/path" to the transmission apparatus (#3) 10 and the transmission apparatus (#5) 10. The APS byte transmission/reception unit 116 provided for the transmission apparatus (#5) 10 transmits the APS byte 411*b* "FS/1/1/ID=5/FEND (1)/path" to the transmission apparatus (#4) 10 and the transmission apparatus (#6) 10. The APS byte transmission/reception unit 116 provided for the transmission apparatus (#6) 10 transmit the APS byte 411*b* "FS/1/1/ID=6/FEND (1)/path" to the transmission apparatus (#5) 10.

Thus, although a switch of transmission paths is performed in the hierarchical layer of the TCM or the section, the presence/absence of the switch of the transmission path may be recognized at the hierarchical level of a path. Therefore, when a switch of transmission paths in a path, a switch of transmission paths in a TCM, and a switch of transmission paths in a TCM are newly issued, it is determined depending on the presence/absence of a switch of transmission paths recognized at a hierarchical level of a path as to whether or not a switch of transmission paths is to be performed. Therefore, the transmission apparatus 10 may switch the transmission paths in easier processing.

With the transmission apparatus, when a switch request is issued for plural types of transmission sections, transmission paths are switched in response to one switch request according to the priority level information indicating the priority level. Therefore, although a switch request (that is, plural switch requests) for plural types of transmission sections, the transmission paths are appropriately switched depending on the priority level of the transmission sections regardless of the order of the execution of plural switch requests. That is, with the above-mentioned transmission apparatus, the trouble of the technical problems such as that the time taken to complete switching the transmission paths (that is, to save the faulty circuit) becomes relatively long, the optimum switch might not be performed, unnecessary switching may occur, etc. may be appropriately avoided or reduced.

For example, considered is the case in which the first switch request from the current circuit to the standby circuit caused by the fault which has occurred in the first transmission section (for example, a path) between the first and second transmission apparatuses, and the second switch request from the standby circuit to the current circuit by the FS to the second transmission section (for example, the TCM) including the first and second transmission apparatuses as an intermediate node are issued. In addition, assume that the priority level information indicates that the priority level of the first transmission section is higher than the priority level of the second transmission section. In this case, at the first switch request, switching is performed from the current circuit to the standby circuit in the first transmission section between the first and second transmission apparatuses. On the other hand, the second switch request is issued to the second transmission section whose priority level is relatively lower than the first switch request. Therefore, in the second transmission section including the first and second transmission apparatuses as an intermediate node, no switching is performed from the standby circuit to the current circuit. Therefore, avoided is the inconvenience that it is difficult to normally transmit a signal between the first and second transmission apparatuses by switching to the current circuit in the second transmission section in the state in which a fault has occurred in the first transmission section.

In the transmitting method described above, an effect similar to the effect obtained by the transmission apparatus may be obtained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus comprising:
an acquisition device that acquires a plurality of switch requests for a transmission path of a signal in plural different types of hierarchized transmission sections, at least a part of the hierarchized transmission sections overlapping one another;
a selection device that selects a switch request for the transmission path of the signal in any one of the hierarchized transmission sections of the plurality of switch requests based on priority level information including a priority level corresponding to each of the plural different types of hierarchized transmission sections, the priority level being set depending on whether or not another transmission apparatus which transmits each of the switch requests is adjacent to the transmission apparatus which acquires the switch requests;
a switch device that switches the transmission paths of a hierarchy depending on the selected switch request; and
a transmission device that transmits switch execution information indicating that the transmission paths are switched depending on the selected switch request to another transmission apparatus accommodated in a transmission section which accommodates the transmission apparatus as an intermediate node.

2. The transmission apparatus according to claim 1, wherein
the switch request includes request state information about a cause of an occurrence of the switch request and section type information about a type of the transmission section as a target of the switch request;
the priority level information includes the priority level corresponding to each of plural different types of hierarchized transmission sections and a priority level corresponding to the cause of the occurrence of the switch request; and
the selection device selects a switch request for the transmission path of the signal in any one of the hierarchized transmission sections of the switch requests for the plural different types of transmission sections according to the priority level information including the priority level corresponding to each of plural different types of hierarchized transmission sections and the priority level corresponding to the cause of the occurrence of the switch request.

3. The transmission apparatus according to claim 1, wherein
the switch request includes position information about a position of a transmission apparatus which transmits the switch request,
the priority level information includes each of the priority level corresponding to each of plural different types of hierarchized transmission sections and a priority level corresponding to the position of the transmission apparatus which transmits the switch request to the transmission apparatus which receives the switch request, and
the selection device selects a switch request for the transmission path of the signal in any one of the hierarchized transmission sections of the switch requests for the plural types of transmission sections according to the priority level information about the priority level corresponding to each of plural different types of hierarchized transmission sections, and the priority level corresponding to the position of the transmission apparatus which transmits the switch request to a transmission apparatus which receives the switch request.

4. The transmission apparatus according to claim 3, wherein
the position information is identification information identifying the transmission apparatus.

5. The transmission apparatus according to claim 1, wherein
the priority level information indicates that the priority level when a first transmission apparatus which transmits the switch request is adjacent to a second transmission apparatus which receives the switch request is higher than the priority level when the first transmission apparatus which transmits the switch request is not adjacent to the second transmission apparatus which receives the switch request.

6. The transmission apparatus according to claim 1, further comprising
a reception device that receives the switch execution information, wherein
the transmission device (i) transmits the switch information which has been received or transmitted to the other transmission apparatus when a priority level of the switch execution information newly received or to be newly transmitted is lower than the priority level of the switch execution information which has been received or transmitted, and (ii) transmits the switch information which has been newly received or is to be transmitted to the other transmission apparatus when a priority level of the switch execution information newly received or to be newly transmitted is higher than the priority level of the switch execution information which has been received or transmitted.

7. The transmission apparatus according to claim 1, wherein
the plural different types of hierarchized transmission sections include at least one of a path, a section, and a Tandem Connection Monitoring (TCM) in accordance with an Optical Transport Network (OTN) recommended in an International Telecommunication Union Telecommunication Standardization Sector (ITU-T).

8. A transmitting method comprising:

acquiring a plurality of switch requests for a transmission path of a signal in plural different types of hierarchized transmission sections, at least a part of the hierarchized transmission sections overlapping one another;

selecting a switch request for the transmission path of the signal in any one of the hierarchized transmission sections of the plurality of switch requests based on priority level information including a priority level corresponding to each of the plural different types of hierarchized transmission sections, the priority level being set depending on whether or not another transmission apparatus which transmits each of the switch requests is adjacent to the transmission apparatus which acquires the switch requests;

switching the transmission paths of the signal in a hierarchized transmission section depending on the selected switch request; and transmitting switch execution information indicating that the transmission paths are switched depending on the selected switch request to another transmission apparatus accommodated in a transmission section which accommodates the transmission apparatus as an intermediate node.

* * * * *